United States Patent
Zhan et al.

(10) Patent No.: US 10,972,148 B2
(45) Date of Patent: *Apr. 6, 2021

(54) SIGNAL BOOSTERS WITH COMPENSATION FOR CABLE LOSS

(71) Applicant: Cellphone-Mate, Inc., Fremont, CA (US)

(72) Inventors: Hongtao Zhan, Fremont, CA (US); Scott Terry, Pleasanton, CA (US)

(73) Assignee: Cellphone-Mate, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,450

(22) Filed: Jan. 15, 2020

(65) Prior Publication Data

US 2020/0343939 A1    Oct. 29, 2020

Related U.S. Application Data

(63) Continuation of application No. 16/139,676, filed on Sep. 24, 2018, now Pat. No. 10,581,484.

(60) Provisional application No. 62/572,670, filed on Oct. 16, 2017, provisional application No. 62/643,616, filed on Mar. 15, 2018.

(51) Int. Cl.
  *H04B 3/10*   (2006.01)
  *H04B 7/155*  (2006.01)
  *H04W 16/26*  (2009.01)

(52) U.S. Cl.
  CPC ........... *H04B 3/10* (2013.01); *H04B 7/15535* (2013.01); *H04W 16/26* (2013.01)

(58) Field of Classification Search
  None
  See application file for complete search history.

(56) References Cited

U.S. PATENT DOCUMENTS

| | | | |
|---|---|---|---|
| 5,812,933 A | 9/1998 | Niki | |
| 6,889,033 B2 | 5/2005 | Bongfeldt | |
| 8,743,713 B2 | 6/2014 | Terry | |
| 8,867,572 B1 * | 10/2014 | Zhan | H04W 16/26 370/497 |
| 9,054,664 B1 | 6/2015 | Ashworth et al. | |
| 9,065,415 B1 | 6/2015 | Van Buren et al. | |
| 9,100,839 B2 | 8/2015 | Zhan | |
| 9,402,190 B2 | 7/2016 | Zhan | |
| 9,408,016 B2 | 8/2016 | Terry | |
| 9,432,852 B2 | 8/2016 | Zhan et al. | |
| 9,444,543 B2 | 9/2016 | Ashworth et al. | |

(Continued)

OTHER PUBLICATIONS

Wilson Pro 1050 User Manual, In-Building Cellular Signal Booster With In-Line Amplification, dated Jan. 3, 2017, in 20 pages.

*Primary Examiner* — Mohammed Rachedine
(74) *Attorney, Agent, or Firm* — Knobbe, Martens, Olson & Bear, LLP

(57) ABSTRACT

Apparatus and methods for signal booster systems with compensation for cable loss are provided herein. In certain configurations, a signal booster system includes two or more antennas for wirelessly communicating RF signals and a signal booster including booster circuitry for providing amplification to at least a portion of the RF signals. At least one of the antennas is connected to the signal booster via a cable. Additionally, the signal booster includes a cable loss compensation circuit that adjusts a gain of the booster circuitry to compensate for a loss of the cable.

20 Claims, 26 Drawing Sheets

(56) References Cited

U.S. PATENT DOCUMENTS

| | | |
|---|---|---|
| 9,526,075 B2 | 12/2016 | Terry |
| 9,673,886 B2 | 6/2017 | Zhan et al. |
| 9,775,051 B2 | 9/2017 | Zhan |
| 9,832,739 B2 | 11/2017 | Terry |
| 9,936,396 B2 | 4/2018 | Zhan |
| 10,313,893 B2 | 6/2019 | Zhan |
| 10,321,418 B2 | 6/2019 | Zhan |
| 10,382,118 B2 | 8/2019 | Zhan et al. |
| 10,581,484 B2 | 3/2020 | Zhan et al. |
| 2004/0097189 A1 | 5/2004 | Bongfeldt et al. |
| 2014/0192849 A1 | 7/2014 | Terry |
| 2014/0194135 A1 | 7/2014 | Terry |
| 2015/0011157 A1 | 1/2015 | Terry |
| 2015/0011208 A1* | 1/2015 | Terry ............... H04W 4/80 455/435.1 |
| 2015/0029909 A1 | 1/2015 | Ashworth et al. |
| 2015/0039788 A1* | 2/2015 | Dearing ............. G06F 13/20 710/18 |
| 2016/0036403 A1 | 2/2016 | Ashworth et al. |
| 2016/0088494 A1 | 3/2016 | Zhan |
| 2016/0095002 A1* | 3/2016 | Zhan ............... H04W 16/26 370/294 |
| 2016/0198347 A1* | 7/2016 | Zhan ............... H04B 1/40 455/23 |
| 2017/0099639 A1 | 4/2017 | Terry |
| 2018/0077585 A1 | 3/2018 | Zhan |
| 2018/0139708 A1 | 5/2018 | Zhan |
| 2018/0219615 A1* | 8/2018 | Ashworth ......... H04B 7/15578 |
| 2019/0036588 A1* | 1/2019 | Kinamon ........... H04B 10/114 |
| 2019/0123774 A1 | 4/2019 | Zhan et al. |
| 2019/0123805 A1 | 4/2019 | Zhan |
| 2019/0140733 A1 | 5/2019 | Zhan |
| 2020/0350943 A1 | 11/2020 | Zhan et al. |

\* cited by examiner

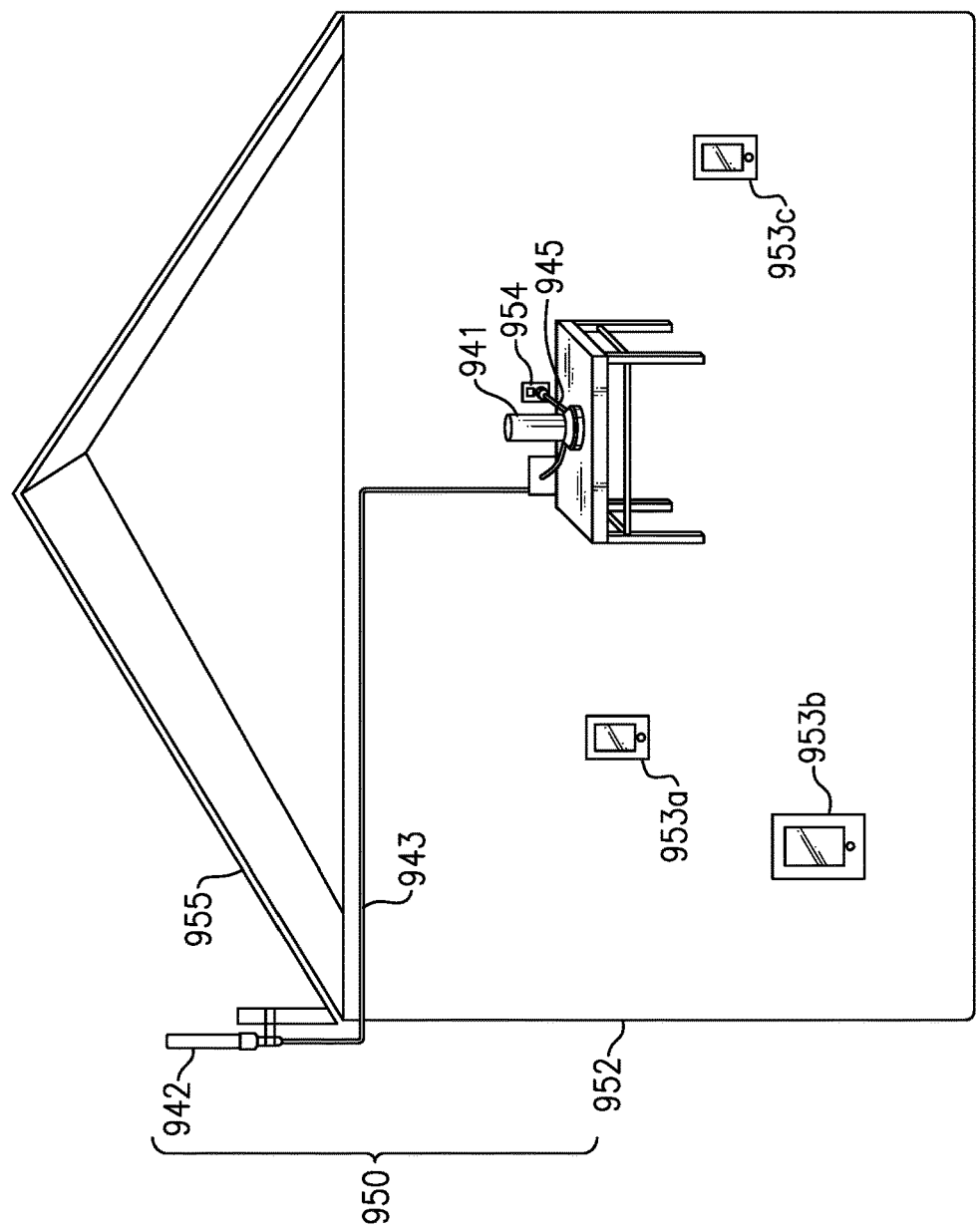
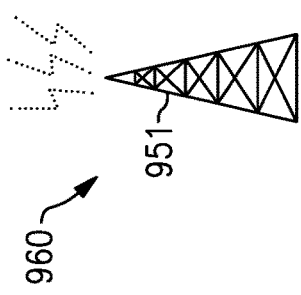
FIG.10A

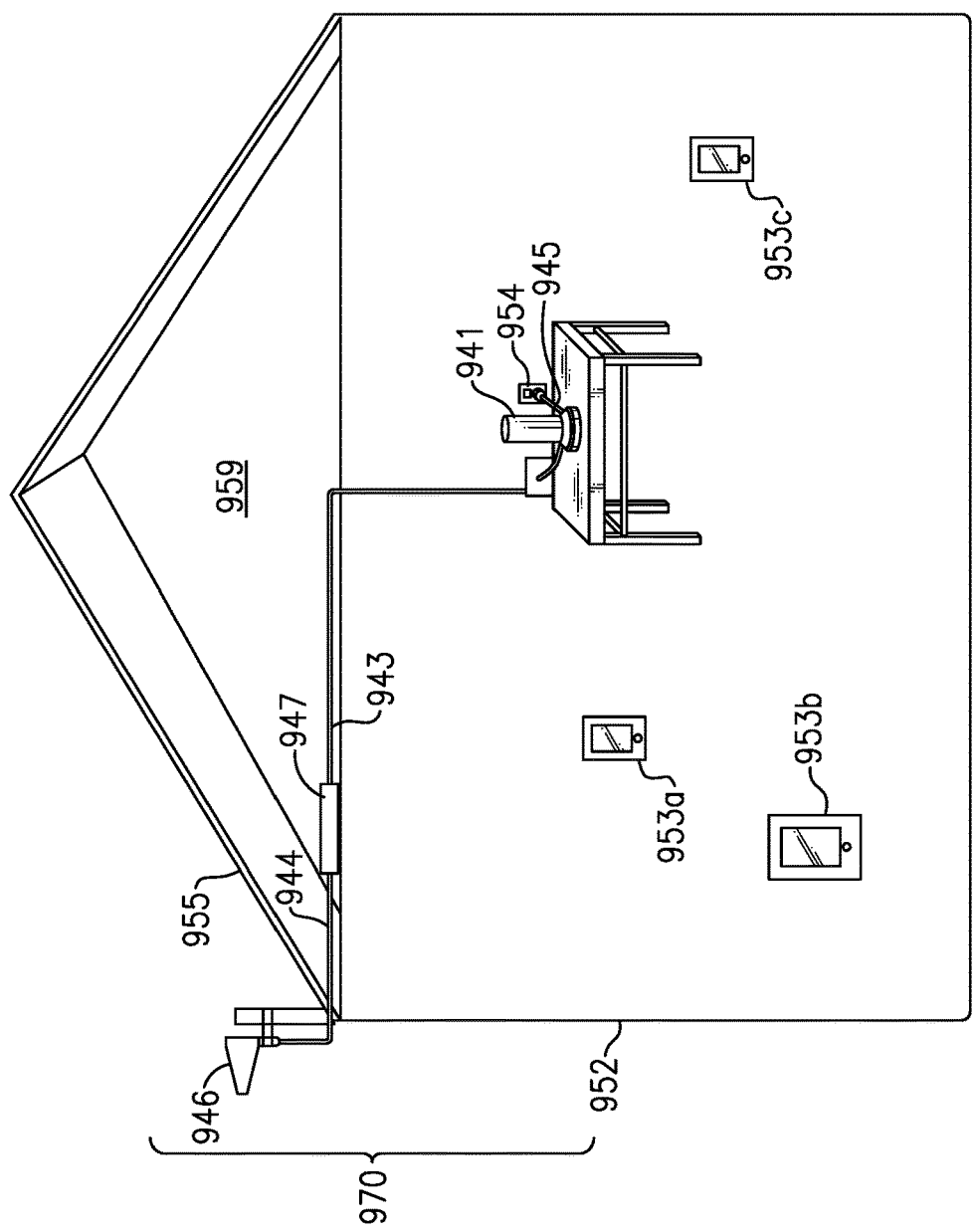
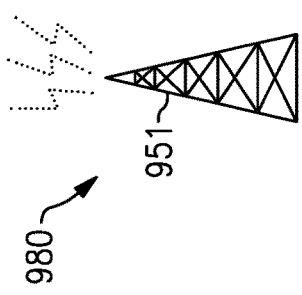
FIG.10B

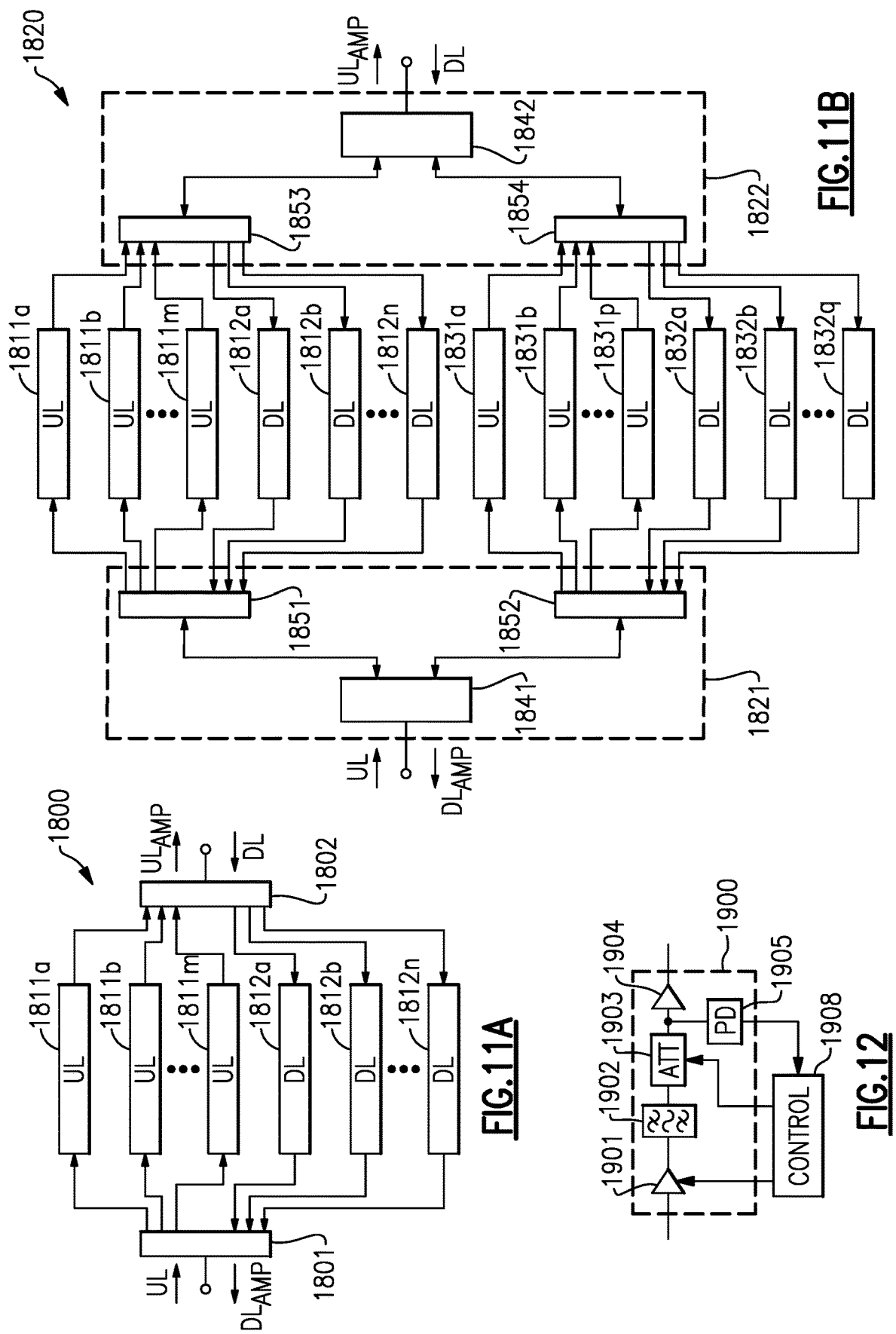

SIGNAL BOOSTERS WITH COMPENSATION FOR CABLE LOSS

REFERENCE TO RELATED CASES

This application is a continuation of U.S. application Ser. No. 16/139,676, which was filed on Aug. 24, 2018 and is titled "SIGNAL BOOSTERS WITH COMPENSATION FOR CABLE LOSS," and which claims priority to U.S. Provisional Patent Application No. 62/643,616 which was filed on Mar. 15, 2018 and is titled "SIGNAL BOOSTERS WITH COMPENSATION FOR CABLE LOSS," and U.S. Provisional Patent Application No. 62/572,670 which was filed Oct. 16, 2017 and is titled "SIGNAL BOOSTERS WITH COMPENSATION FOR CABLE LOSS," the disclosures of which are expressly incorporated by reference herein in their entirety for all purposes. Any and all applications, if any, for which a foreign or domestic priority claim is identified in the Application Data Sheet of the present application are hereby incorporated by reference in their entireties under 35 CFR 1.57.

FIELD

Embodiments of the invention relate to electronic systems and, in particular, to signal boosters for boosting radio frequency (RF) signals of a cellular network.

BACKGROUND

A cellular or mobile network can include base stations for communicating with wireless devices located within the network's cells. For example, base stations can transmit signals to wireless devices via a downlink (DL) channel and can receive signals from the wireless devices via an uplink (UL) channel. In the case of a network operating using frequency division duplexing (FDD), the downlink and uplink channels are separated in the frequency domain such that the frequency band operates using a pair of frequency channels.

A wireless device may be unable to communicate with any base stations when located in a portion of the mobile network having poor or weak signal strength. To improve a network's signal strength and/or coverage, a radio frequency (RF) signal booster can be used to amplify signals in the network. For example, the signal booster can be used to amplify or boost signals having frequencies associated with the frequency ranges of the network's uplink and downlink channels.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description of Embodiments" one will understand how the features of this invention provide advantages that include improved communications between base stations and mobile devices in a wireless network.

In one aspect, a signal booster system is provided. The signal booster system includes a plurality of antennas comprising a first antenna and a second antenna, a first cable, and a signal booster connected to the first antenna via the first cable. The signal booster comprises booster circuitry configured to generate a boosted RF signal based on amplifying an RF signal received on the second antenna, and to send the boosted RF signal to the first antenna via the first cable, and a cable loss compensation circuit configured to adjust a gain of the booster circuitry to compensate for a loss of the first cable.

In another aspect, a method of signal boosting is provided. The method includes receiving an RF signal from one or more base stations of a cellular network using a base station antenna, generating a boosted RF signal based on amplifying the RF signal using booster circuitry of a signal booster, sending the boosted RF signal to the first antenna via the first cable, and adjusting a gain of the booster circuitry to compensate for a loss of the first cable using a cable loss compensation circuit of the signal booster.

BRIEF DESCRIPTION OF THE DRAWINGS

FIG. 10A is a schematic diagram of a mobile network according to one embodiment.

FIG. 10B is a schematic diagram of a mobile network according to one embodiment.

FIG. 11A is a schematic diagram of one embodiment of booster circuitry.

FIG. 11B is a schematic diagram of another embodiment of booster circuitry.

FIG. 12 is a schematic diagram of one embodiment of an amplification circuit.

DETAILED DESCRIPTION OF EMBODIMENTS

Figure 1A:
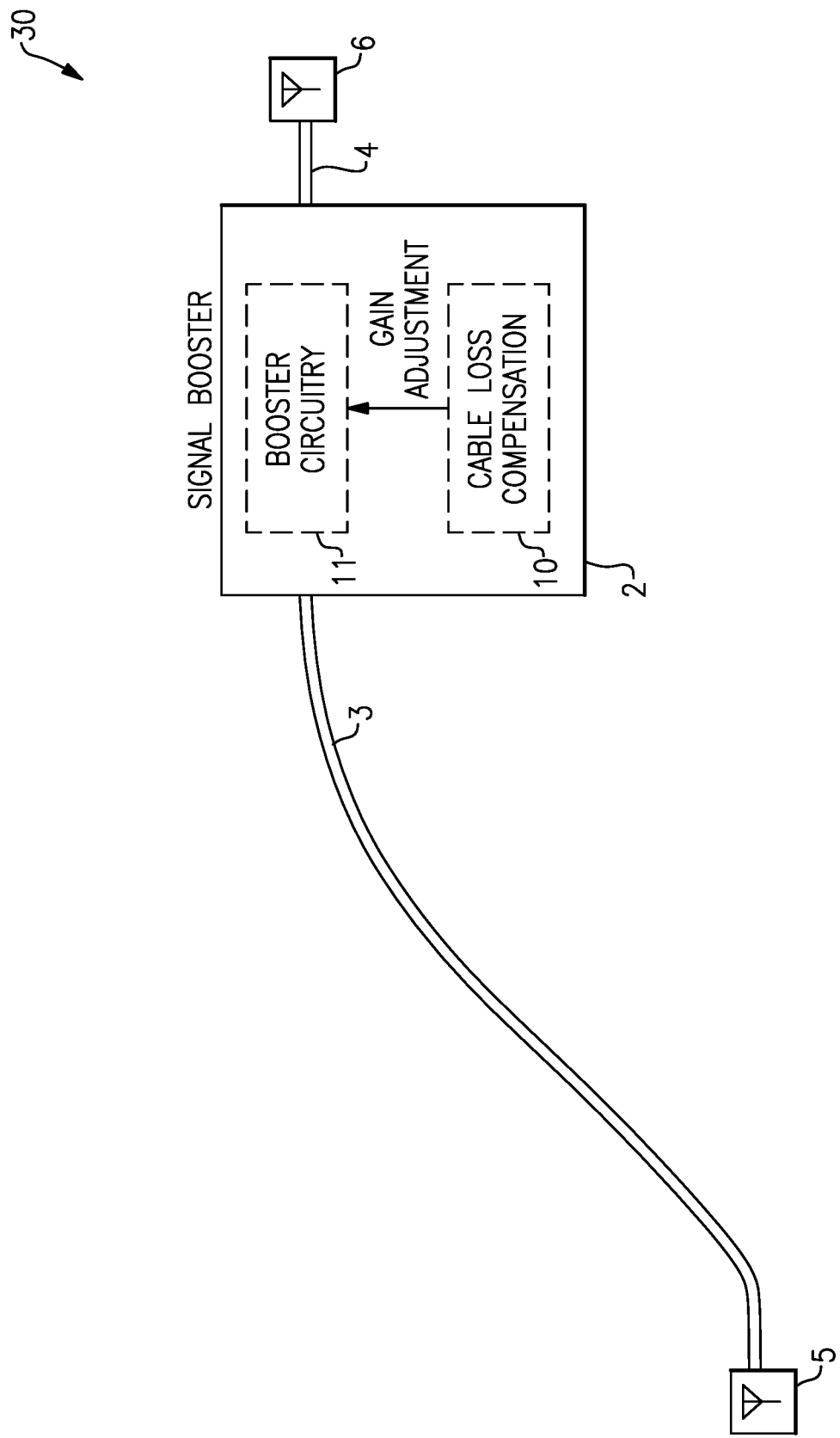
FIG. 1A is a schematic diagram of a signal booster system according to one embodiment.

Various aspects of the novel systems, apparatus, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatus, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Installing a signal booster system in a building can advantageously improve both downlink signal strength and uplink signal strength of mobile devices within the building.

For example, walls of buildings can have a shielding effect on signals transmitted and received by mobile devices within the building. Furthermore, buildings can include metal, such as beams, pipes, brackets, nails, and screws that inhibit propagation of radio waves.

The shielding effect of buildings can attenuate downlink signals from the base station within the buildings and/or attenuate uplink signals transmitted from within the buildings. Under most conditions, the shielding effect can cause signal strength to drop. In one example, the shielding effect reduces signal strength below a threshold for cellular communication, thereby preventing successful voice and/or data communication. In another example, a mobile device operates with higher transmit power to compensate for a loss in signal strength from shielding, and thus operates with greater power consumption and reduced battery life. In yet another example, a mobile device operates with lower signal quality, and thus lower data rate and/or lower voice quality.

Accordingly, including a signal booster system in a building improves signal strength of mobile devices within the building. Furthermore, such a signal booster system also improves signal-to-noise ratio (SNR) of the mobile devices, thereby permitting mobile devices to transmit at a lower power level to extend battery life. For example, higher SNR can be realized by using superior antennas relative to those used in typical mobile phones, for instance, due to relaxed size and/or power constraints. Moreover, signal boosters can operate with better quality receivers and/or transmitters relative to mobile devices.

A signal booster system can include one or more cables used for connecting between antennas used for wireless communications and a signal booster that houses booster circuitry used for providing signal amplification. For example, a cable can be provided between the signal booster and a mobile station antenna used for wirelessly communicating with mobile devices of a cellular network. Although cables can ease installation and/or provide distance that enhances antenna-to-antenna isolation, cables also provide signal loss. Moreover, cable loss is frequency dependent, and thus can become very significant as cellular communication frequencies increase, for instance, in 5G technologies associated with frequencies in the 6 GHz to 100 GHz range.

Certain regulatory bodies, such as the Federal Communications Commission (FCC), issue regulations pertaining to the design and/or installation of signal boosters. For example, the FCC issues regulations limiting a maximum gain of signal booster systems to reduce the likelihood of interference to wireless networks and other communication services.

In one example, the FCC limits a maximum signal gain of a signal booster system as measured from one antenna of the signal booster system to another antenna of the signal booster system.

The presence of cables in a signal booster system can cause loss that reduces the maximum amount of gain provided by the signal booster system. For instance, to comply with an FCC regulation that limits maximum antenna-to-antenna gain to be 70 dB, a signal booster's amplification circuitry can provide up to about 70 dB of gain. Limiting the signal booster's gain in this manner allows the FCC regulation to be met for a range of installation scenarios and cable lengths, including when a user provides alternations to the signal booster system. However, when a cable loss of 5 dB is present, the signal booster system provides only about 65 dB of antenna-to-antenna gain in operation.

Apparatus and methods for signal booster systems with compensation for cable loss are provided herein. In certain configurations, a signal booster system includes two or more antennas for wirelessly communicating RF signals and a signal booster including booster circuitry for providing amplification to at least a portion of the RF signals. At least one of the antennas is connected to the signal booster via a cable. Additionally, the signal booster includes a cable loss compensation circuit that adjusts a gain of the booster circuitry to compensate for a loss of the cable.

By including the cable loss compensation circuit, the gain of the booster circuitry can be adjusted to dynamically compensate for cable loss present in a particular signal booster system. The cable loss compensation circuit provides gain adjustment based on directly or indirectly detecting cable loss that is present, thereby providing gain correction tailored to the signal booster system.

Thus, rather than having to limit the booster circuitry to providing gain that is at or beneath an FCC limitation and/or other regulatory specification, the booster circuitry can operate with higher gain to compensate for loss of the cable. For instance, when 5 dB of cable loss is present in a signal booster system, the gain of the booster circuitry can be operated at 5 dB above the FCC limitation on antenna-to-antenna gain to compensate for the cable loss. Thus, the signal booster system can operate with antenna-to-antenna gain that is about equal to the regulatory limitation.

Accordingly, including the cable loss compensation circuit provides gain adjustment that enhances antenna-to-antenna gain of a signal booster system, thereby improving communication range and/or signal quality.

The signal booster systems herein can detect and compensate for cable loss in a wide variety of ways.

In a first example, the signal booster system is implemented to operate with a selected cable chosen from multiple available cables having different lengths and identifiers. For instance, cables of different lengths can have different identifiers, such as unique connectors and/or unique electronic identifications. Additionally, the signal booster includes a connected cable detector implemented to detect the identifier of the particular cable connected to the signal booster, thereby indirectly detecting what length of cable is present in the signal booster system. The cable loss compensation circuit provides a suitable amount of gain adjustment based on which cable is detected.

In a second example, the signal booster system includes a test signal injector positioned at or near a first end of the cable, and a signal detector positioned at or near the second end of the cable. For instance, an oscillator for injecting a test frequency tone can be included at one end of the cable, and a power detector for detecting test signal level can be included at the opposite end of the cable. Additionally, the cable loss compensation circuit can provide a suitable amount of gain adjustment to the signal booster's amplification circuitry based on the detected amount of test signal loss arising from the cable.

In a third example, the signal booster system includes a first signal detector positioned at or near a first end of the cable, and a second signal detector positioned at or near the second end of the cable. Additionally, the outputs of the first and second signal detectors are used to determine a difference in RF signal level (for instance, signal power) between the two positions of the cable to thereby determine the cable's loss. The RF signal(s) monitored by the detectors can include uplink and/or downlink signals of the cellular network. Thus, in certain implementations the cable loss compensation circuit provides gain adjustment to the signal booster based on observing the difference in detected signal level of RF signals associated with normal operation of the signal booster system.

In a fourth example, the cable connecting the antenna and the signal booster is used not only for communicating RF signals, but also for providing power. For instance, the cable can correspond to a complex cable bundling separate RF and power cables or to a shared DC and RF power cable in which a common conductor is used to carry both power and RF signals. Additionally, the signal booster receives power from the cable, and the cable's loss is estimated based on a DC voltage drop of the cable.

FIG. 1A is a schematic diagram of a signal booster system 30 according to one embodiment. The signal booster system 30 includes a signal booster 2, a first cable 3, a second cable 4, a first antenna 5, and a second antenna 6. As shown in FIG. 1A, the signal booster 2 includes a cable loss compensation circuit 10 and booster circuitry 11.

As shown in FIG. 1A, the signal booster 2 is connected to the first antenna 5 via the cable 3, which can be relatively long. For example, in certain implementations the cable 3 has a length of at least 20 feet, for instance, between 50 feet and 200 feet. Since the cable 3 is relatively long, the loss of the cable 3 can be relatively high. Absent compensation, the loss of the cable 3 can lead to a degradation of the gain of the signal booster system 30, which in turn can limit range and/or signal quality of wireless communications.

In the illustrated embodiment, the signal booster 2 is connected to the second antenna 6 via the cable 4, which can be relatively short in certain implementations. For example, in certain configurations the cable 4 between the second antenna 6 and the signal booster 2 is less than about 5 feet and/or provides less than 1 dB of loss at the highest signal frequency of interest. In another embodiment, the cable 4 is omitted in favor of integrating the second antenna 6 with the signal booster 2.

Although an example of a signal booster system with two antennas is shown, the teachings herein are also applicable to configurations with additional antennas. Furthermore, a signal booster system can include additional housings or units. Such a secondary unit can include electronic circuitry and components, such as power management circuitry, signal detectors, and/or other electronics. In certain implementations, one or more antennas can be integrated with a secondary unit and/or connected to the signal booster via the secondary unit.

In one embodiment, the first antenna 5 is an indoor mobile station antenna within a building (for instance, a home or office) and operable to wirelessly communicate with one or more mobile devices of a cellular network. Additionally, the second antenna 6 is a base station antenna that is positioned outside of the building and operable to wirelessly communicate with one or more base stations of the cellular network. In certain implementations, the signal booster 2 is also positioned outside of the building with the second antenna 6. In other implementations, the signal booster 2 is positioned indoors but in relatively close proximity to the second antenna 6. In another embodiment, the first antenna 5 is a base station antenna operable to wirelessly communicate with one or more base stations and the second antenna 6 is a mobile station antenna operable to wirelessly communicate with one or more mobile devices.

The booster circuitry 11 provides amplification to RF signals associated with one or more uplink and downlink channels. The booster circuitry 11 can include a wide variety of circuitry and/or components. Examples of circuitry and components of the booster circuitry 11 include, but are not limited to, amplifiers (for instance, LNAs, power amplifiers (PAs), variable gain amplifiers (VGAs), programmable gain amplifiers (PGAs), and/or other amplification circuits), filters (for instance, surface acoustic wave (SAW) filters, bulk acoustic wave (BAW) filters, film bulk acoustic resonator (FBAR) filters, active circuit filters, passive circuit filters, and/or other filtering structures), duplexers, circulators, frequency multiplexers (for instance, diplexers, triplexers, or other multiplexing structures), switches, impedance matching circuitry, attenuators (for instance, digital-controlled attenuators such as digital step attenuators (DSAs) and/or analog-controlled attenuators such as voltage variable attenuators (VVAs)), detectors, monitors, couplers, and/or control circuitry.

With continuing reference to FIG. 1A, the cable 3 can be relatively long and provide significant cable loss. Absent compensation, the cable loss degrades transmit power and/or receiver sensitivity.

The illustrated signal booster 2 includes the cable loss compensation circuit 10, which provides gain adjustment to the booster circuitry 11. For example, the cable loss compensation circuit 10 can provide gain adjustment to uplink gain and/or downlink gain of the booster circuitry 11 to compensate for cable loss of the cable 3. In implementations in which the booster circuitry 11 includes multiple amplification paths (for instance, amplification paths associated with different frequency bands) different amounts of compensation can be provided for different amplification paths. The gain adjustment can be provided in a wide variety of ways, such as controlling the amount of amplification provided by one or more controllable amplification circuits (for instance, VGAs and/or PGAs) and/or controlling the amount of attenuation provided by one or more controllable attenuation circuits (for instance, DSAs and/or VVAs).

Although an example in which the cable loss compensation circuit provides compensation for the loss of one cable has been described, the teachings herein are also applicable to configurations in which a cable loss compensation circuit provides compensation for loss of multiple cables. For example, in certain implementations the cable loss compensation circuit 10 not only provides a first gain adjustment to compensate for loss of the cable 3, but also provides a second gain adjustment to compensate for loss of the cable 4.

The cable loss compensation circuit 10 can be implemented in a wide variety of ways. In certain implementations, the cable loss compensation circuit 10 comprises a control circuit, such as a microcontroller, microprocessor, and/or digital controller. The signal booster system 30 can detect for and compensate for cable loss in a wide variety of ways, including, but not limited to, using any of the detection and compensation schemes described herein.

Figure 1B:
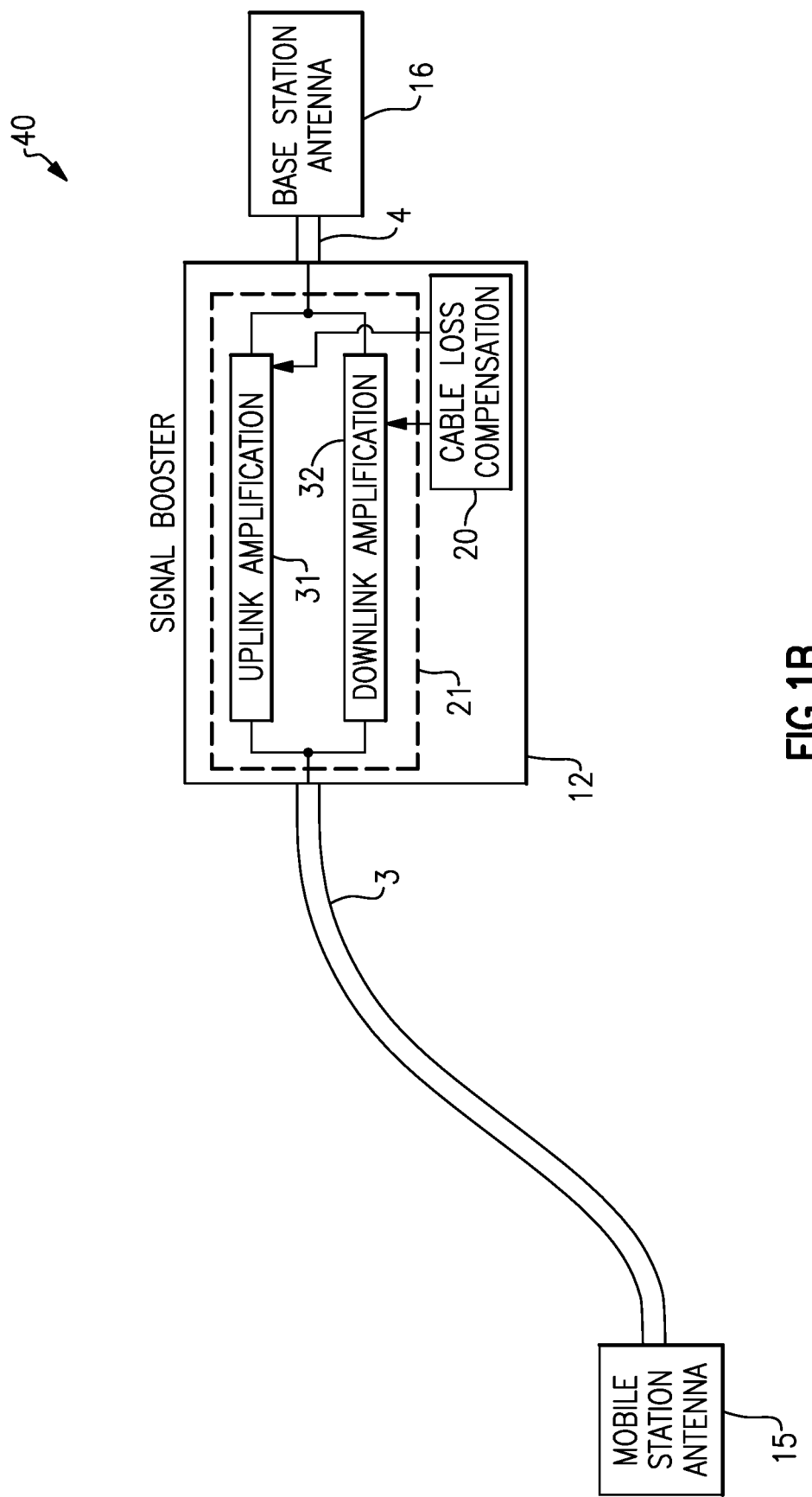
FIG. 1B is a schematic diagram of a signal booster system according to another embodiment.

FIG. 1B is a schematic diagram of a signal booster system 40 according to another embodiment. The signal booster system 40 includes a first cable 3, a second cable 4, a signal booster 12, a mobile station antenna 15, and a base station antenna 16. As shown in FIG. 1B, the signal booster 12 includes a cable loss compensation circuit 20 and booster circuitry 21. The booster circuitry 21 includes an uplink amplification circuit 31 and a downlink amplification circuit 32, and illustrates one implementation of the booster circuitry 11 of FIG. 1A.

In the illustrated embodiment, the base station antenna 16 is separate from the signal booster 12 and connected thereto by the cable 4. In certain implementations, the cable 4 between the base station antenna 16 and the signal booster 12 is less than about 5 feet and/or provides less than 1 dB of loss at the highest signal frequency of interest.

Although the signal booster system 40 includes a separate base station antenna and signal booster, the teachings herein are also applicable to configurations in which the base station antenna 16 is integrated with the signal booster 12. In one example, the base station antenna 16 can be integrated inside of a housing of the signal booster 12 and/or extend therefrom. In another example, both an integrated base station antenna and an external base station antenna are included. In such an implementation, multiple base station antennas can be used for communications or a particular base station antenna can be selected for communications at a given time.

The mobile station antenna 15 can be positioned within a building, and the base station antenna 16 can be positioned outside of the building. In certain implementations, the signal booster 12 is also positioned outside of the building with the base station antenna 16. In other implementations, the signal booster 12 is positioned indoors but in relatively close proximity to the base station antenna 16. Proximately locating the signal booster 12 to the base station antenna 16 can provide a number of advantages such as enhanced transmit power and/or receiver sensitivity.

In the illustrated embodiment, the booster circuitry 21 receives RF uplink signals from the mobile station antenna 15 via the cable 3. The RF uplink signals are amplified by an uplink amplification circuit 31 of the booster circuitry 21, and subsequently transmitted on the base station antenna 16. The base station antenna 16 also receives RF downlink signals, which are amplified by a downlink amplification circuit 32 of the booster circuitry 21, and subsequently transmitted to the mobile station antenna 15 via the cable 3.

The booster circuitry 21 can include a wide variety of circuitry and/or components. Examples of circuitry and components of the booster circuitry 21 can be as described earlier with respect to the booster circuitry 11 of FIG. 1A. In certain embodiments, the uplink amplification circuit 31 includes at least one amplifier having controllable gain (for instance, a PGA or VGA) and the downlink amplification circuit 32 includes at least one amplifier having controllable gain.

The cable loss compensation circuit 20 provides gain adjustment to the booster circuitry 21. For example, the cable loss compensation circuit 20 can provide gain adjustment to the uplink amplification circuit 31 and/or the downlink amplification circuit 32 to compensate for loss of the cable 3. In implementations in which the uplink amplification circuit 31 includes multiple amplification paths (for instance, amplification paths associated with different frequency bands) different amounts of compensation can be provided for different amplification paths (see, for example, FIG. 13). Likewise, in implementations in which the downlink amplification circuit 32 includes multiple amplification paths different amounts of compensation can be provided for different amplification paths (see, for example, FIG. 13).

The gain adjustment can be provided in a wide variety of ways, such as controlling the amount of amplification provided by one or more controllable amplification circuits and/or controlling the amount of attenuation provided by one or more controllable attenuation circuits (see, for example, FIG. 12). The cable loss compensation circuit 20 can detect for and compensate for cable loss in a wide variety of ways, including, but not limited to, using any of the detection and compensation schemes described herein.

Figure 1C:
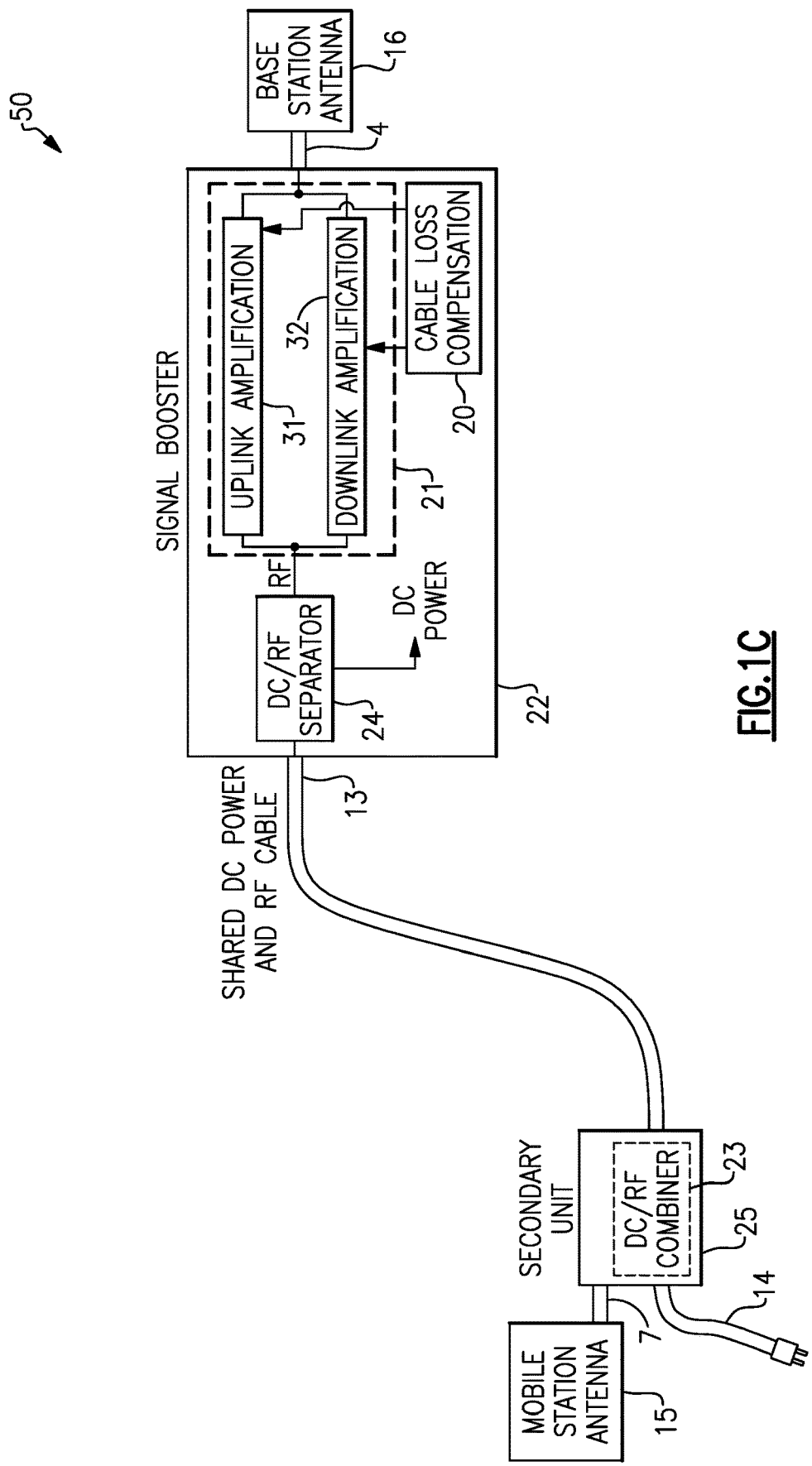
FIG. 1C is a schematic diagram of a signal booster system according to another embodiment.

FIG. 1C is a schematic diagram of a signal booster system 50 according to another embodiment. The signal booster system 50 includes a cable 4, a cable 7, a shared DC power and RF cable 13, a power cable 14, a mobile station antenna 15, a base station antenna 16, a signal booster 22, and a secondary unit 25. As shown in FIG. 1C, the signal booster 22 includes a cable loss compensation circuit 20, booster circuitry 21, and a DC/RF separator 24. Additionally, the secondary unit 25 includes a DC/RF combiner 23, and is connected to the mobile station antenna 15 by the cable 7, in this embodiment.

The secondary unit 25 can be placed in any suitable location, for instance, in an interior of a building. In one example, the secondary unit 25 can be set on a table top, windowsill, floor, or other suitable location. In another example, the secondary unit 25 is mountable or otherwise attachable to a wall, ceiling, or other suitable location. In certain implementations, the signal booster 22 can be placed outdoors and isolated from the mobile station antenna 15 within the building. The isolation can be provided at least in part by the building. Furthermore, in certain implementations explicit isolation structures can be included in the signal booster 22 and/or secondary unit 25 to further enhance antenna-to-antenna isolation and inhibit unintended oscillation of the signal booster system 50.

In the illustrated embodiment, the secondary unit 25 receives power from a building power source (for instance, an electrical outlet) via a power cable 14. In one example, a power adapter of the power cable 14 provides AC to DC conversion to provide the secondary unit 25 with DC power. In another example, AC to DC conversion is provided by circuitry in the secondary unit 25.

The secondary unit 25 provides a DC supply voltage to the signal booster 22 via the shared DC power and RF cable 13, in this embodiment. The secondary unit 25 includes the DC/RF combiner 23, which combines a DC power supply and an RF signal while providing isolation. For example, the DC/RF combiner 23 can combine a DC supply voltage generated from a building power source with RF signals associated with communications of the mobile station antenna 15. The RF signals include RF signals transmitted by the mobile station antenna 15 and RF signals received by the mobile station antenna 15. Accordingly, the shared DC power and RF cable 13 can operate bi-directionally with respect to RF signaling.

In certain implementations, the shared DC power and RF cable 13 includes a conductor that carries an RF voltage that is superimposed on a DC supply voltage. Implementing a signal booster system with a shared DC power and RF cable can provide a number of advantages, such as reduced cabling cost, reduced connectors/connections, improved reliability, and/or enhanced integration. However, other implementations are possible. For example, in another embodiment, a separate power cable (DC and/or AC) is provided directly to the signal booster 22. In yet another embodiment, separate power and RF cables are bundled as a complex cable.

The signal booster 22 of FIG. 1C includes the DC/RF separator 24, which provides separation to extract a DC supply voltage from the shared DC power and RF cable 13 to thereby power electronic circuitry of the signal booster 22, such as the cable loss compensation circuit 20 and the booster circuitry 21. Additionally, the DC/RF separator 24 also facilitates transmission and reception of RF signals by the signal booster 22 over the cable 13.

In certain implementations, the DC/RF separator 24 includes isolation circuitry (for instance, filters and/or other isolators) for isolating RF circuitry used for signal boosting from DC supply noise and separation circuitry for separating RF and DC.

Although the signal booster 22 is illustrated as including the DC/RF separator 24, in certain embodiments the DC/RF separator 24 is omitted. For example, the DC/RF separator 24 can be omitted in implementations in which DC and/or AC power is provided to the signal booster 22 separately from RF signals.

In the illustrated embodiment, the booster circuitry 21 receives RF uplink signals received from the mobile station antenna 15 via the shared DC power and RF cable 13. The RF uplink signals are amplified by an uplink amplification circuit 31 of the booster circuitry 21, and subsequently transmitted on the base station antenna 16. The base station antenna 16 also receives RF downlink signals, which are amplified by a downlink amplification circuit 32 of the booster circuitry 21, and subsequently transmitted to the mobile station antenna 15 via the shared DC power and RF cable 13.

In certain implementations, the cable loss compensation circuit 20, the booster circuitry 21, and/or the DC/RF separator 24 are included on one or more circuit boards enclosed within the housing of the signal booster 22.

Figure 1D:
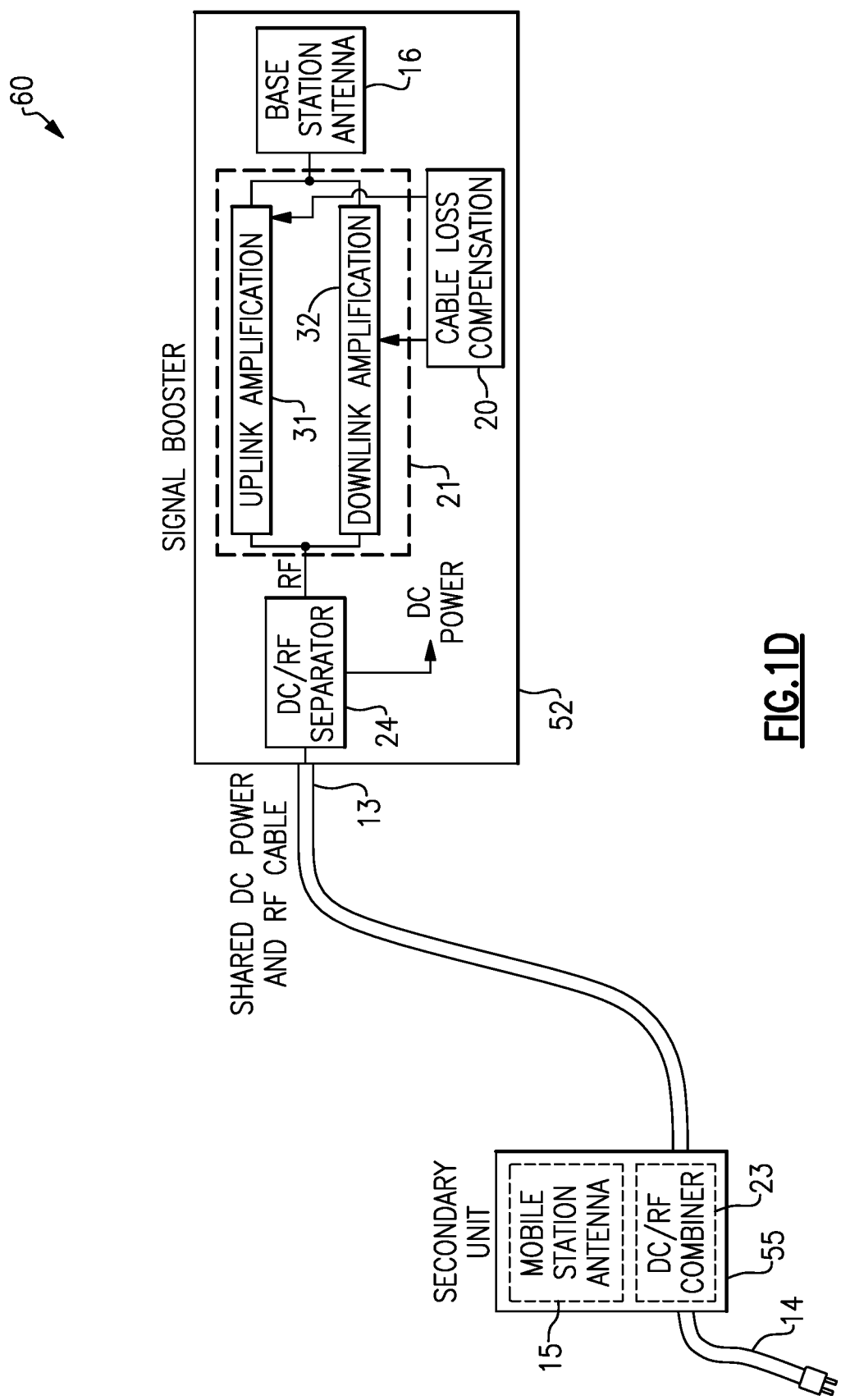
FIG. 1D is a schematic diagram of a signal booster system according to another embodiment.

FIG. 1D is a schematic diagram of a signal booster system 60 according to another embodiment. The signal booster system 60 includes a shared DC power and RF cable 13, a power cable 14, a signal booster 52, and a secondary unit 55. The signal booster 52 includes a base station antenna 16, a cable loss compensation circuit 20, booster circuitry 21, and a DC/RF separator 24. Additionally, the secondary unit 55 includes a mobile station antenna 15 and a DC/RF combiner 23.

The signal booster system 60 of FIG. 1D is similar to the signal booster system 50 of FIG. 1C, except that the base station antenna 16 is integrated into the signal booster 52 and the mobile station antenna 15 is integrated into the secondary unit 55. Thus, the cable 4 and the cable 7 are omitted in the signal booster system 60 of FIG. 1D.

The teachings herein are applicable to signal booster systems implemented using a wide variety of antenna configurations including, but not limited to, implementations in which a base station antenna is integrated with a signal booster and/or implementations in which a mobile station antenna is integrated with a secondary unit.

Integrating a base station antenna with a signal booster can improve transmit power and/or enhance receiver sensitivity relative to an implementation in which an external cable is used to connect a signal booster to a base station antenna. Furthermore, enhanced transmit power and receiver sensitivity also leads to higher SNR and a corresponding improvement in the quality, speed, and/or reliability of communications.

In certain configurations, the base station antenna 16 extends from a housing of the signal booster 52 and/or is integrated inside of the booster's housing. Although a single base station antenna 16 is illustrated, the teachings herein are applicable to configurations using multiple base station antennas.

With continuing reference to FIG. 1D, the mobile station antenna 15 is also integrated with the secondary unit 55, in this embodiment. In certain configurations, the mobile station antenna 15 extends from the housing of the secondary unit 1 and/or is integrated inside a housing of the secondary unit 55. However, other implementations are possible, such as configurations in which the mobile station antenna 15 connects to the secondary unit 55 via a cable or configurations in which the secondary unit is omitted in favor of a standalone mobile station antenna. Although a single mobile station antenna 15 is illustrated, the teachings herein are applicable to configurations using multiple mobile station antennas.

Figure 1E:
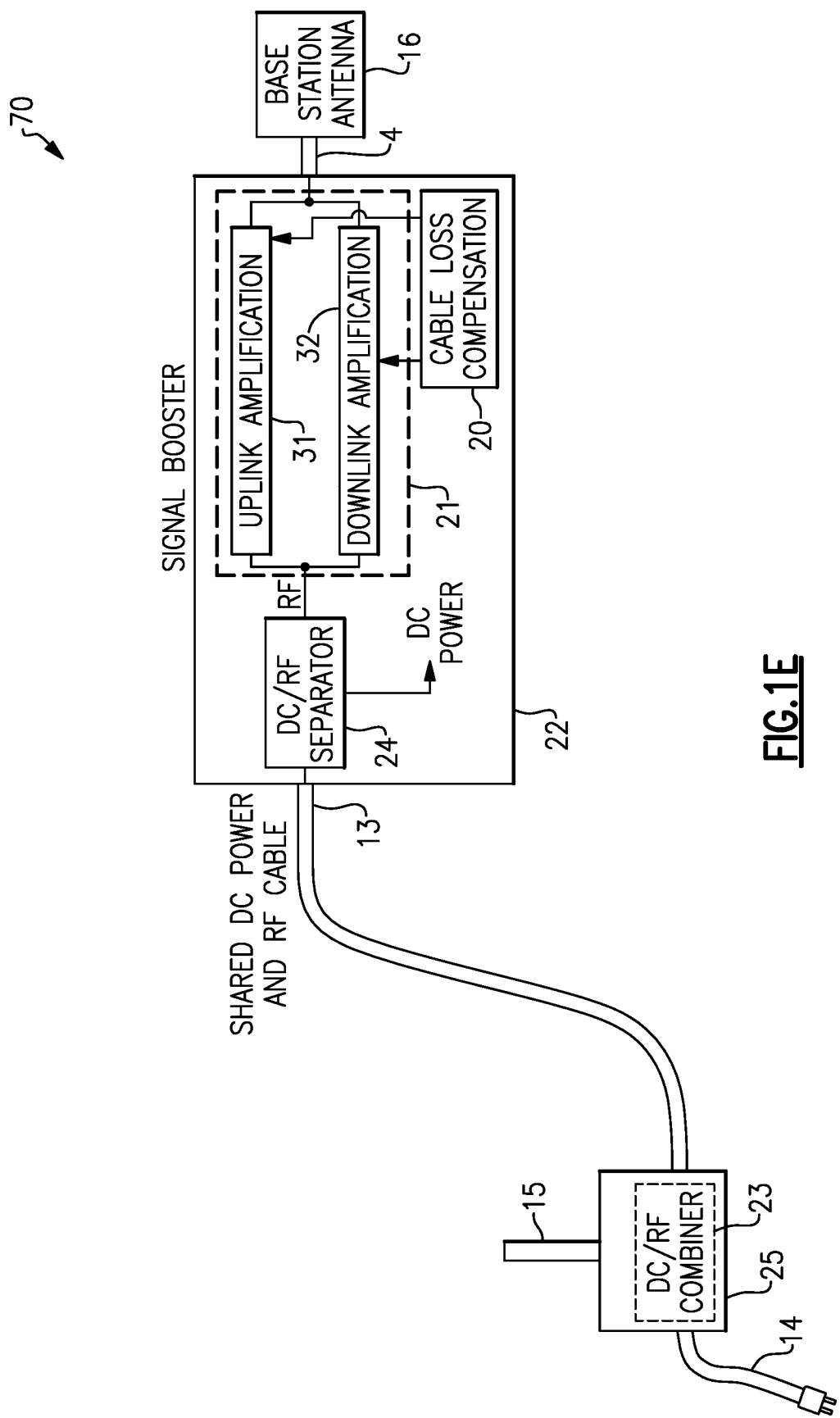
FIG. 1E is a schematic diagram of a signal booster system according to another embodiment.

FIG. 1E is a schematic diagram of a signal booster system 70 according to another embodiment. The signal booster system 70 of FIG. 1E is similar to the signal booster system 50 of FIG. 1C, except that the signal booster system 70 illustrates an embodiment in which the mobile station antenna 15 extends from a housing of the secondary unit 25.

Figure 1F:
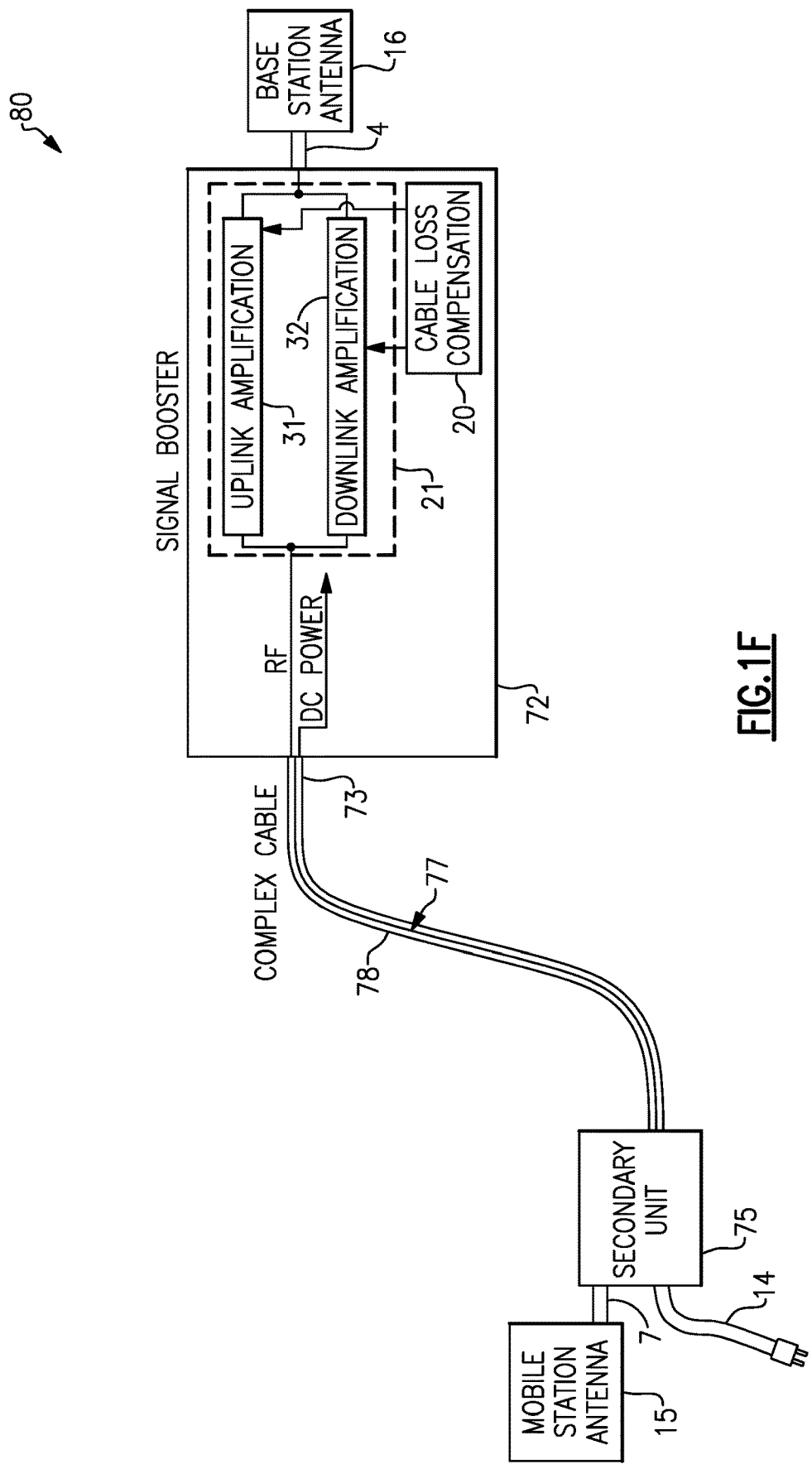
FIG. 1F is a schematic diagram of a signal booster system according to another embodiment.

FIG. 1F is a schematic diagram of a signal booster system 80 according to another embodiment. The signal booster system 80 of FIG. 1F is similar to the signal booster system 50 of FIG. 1C, except that the signal booster system 80 illustrates an embodiment in which a complex cable 77 is used to connect a signal booster 72 and a secondary unit 75. The complex cable 77 is also referred to herein as a composite cable.

The complex cable 77 includes a power cord 73 that carries DC power and an RF line 78 that carries RF signals. As shown in FIG. 1F, the power cord 73 and the RF line 78 are bundled together, for instance, in a common exterior insulator or casing.

Figure 2:
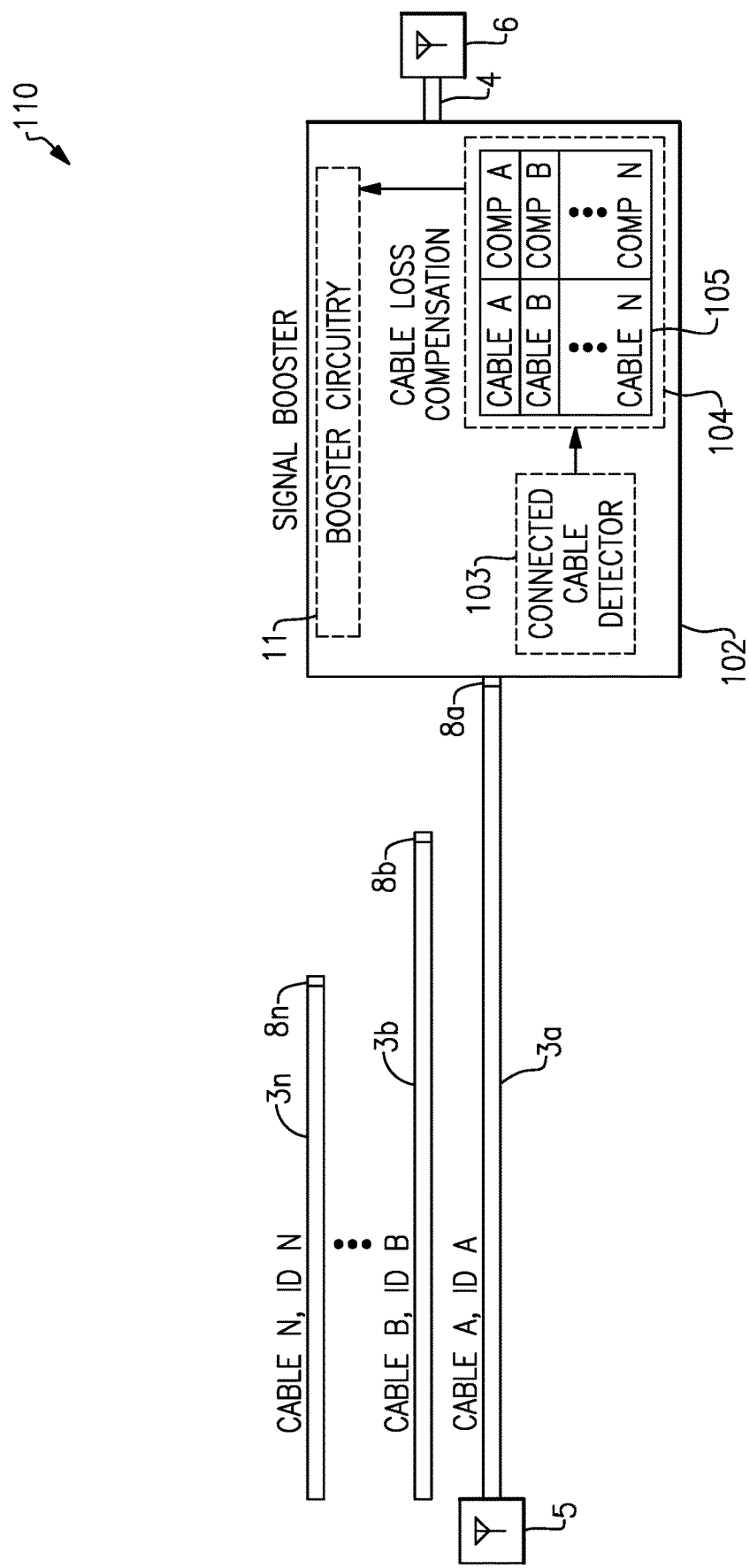
FIG. 2 is a schematic diagram of a signal booster system according to another embodiment.

FIG. 2 is a schematic diagram of a signal booster system 110 according to another embodiment. The signal booster system 110 includes a cable 4, a first antenna 5, a second antenna 6, and a signal booster 102. As shown in FIG. 2, the signal booster system 110 further includes multiple cables 3a, 3b . . . 3n that are selectively connectable between the first antenna 5 and the signal booster 102. The cables 3a, 3b . . . 3n each have a different length and identifier.

The signal booster 102 includes booster circuitry 11, a connected cable detector 103, and a cable loss compensation circuit 104. The booster circuitry 11 is used to provide amplification to RF signals handled by the signal booster system 110, such as uplink and/or downlink signals.

The signal booster system 110 is implemented to operate with a selected cable chosen from multiple cables having different lengths and identifiers. For example, the signal booster system 110 is illustrated with the cable 3a connected. However, the cable 3a can be disconnected in favor of connecting any of the other cables between the first antenna 5 and the signal booster 102. Although an example with three cables 3a, 3b . . . 3n is shown, more or fewer cables can be available for connection as indicated by the ellipses. For example, a selected cable chosen from two cables, three cables, four cables, or five or more cables can be connected between the first antenna 5 and the signal booster 102. Furthermore, although the cable 3a is shown as being directly connected between the signal booster 102 and the first antenna 5, one or more intermediate components can be present. For example, one of the cables 3a, 3b . . . 3n can connect between the signal booster 102 and a secondary unit, which in turn connects to the first antenna 5.

In the illustrated embodiment, the cables 3a, 3b . . . 3n each have a different length and electronic identifier (ID A, ID B . . . ID N). Additionally, the connected cable detector 103 determines which of the cables 3a, 3b . . . 3n is connected based on the electronic identifier. Additionally or alternatively, in certain implementations the cables 3a, 3b . . . 3n have connectors 8a, 8b . . . 8n, respectively, which can be unique to serve as identification for a particular cable.

Accordingly, each of the cables 3a, 3b . . . 3n can be implemented with a different identifier, such as unique connectors and/or unique electronic identifications that are detectable by the connected cable detector 103. Thus, the connected cable detector 103 can determine which of the cables 3a, 3b . . . 3n is connected based on the identifier, thereby indirectly detecting the cable length and corresponding cable loss that is present.

In the illustrated embodiment, the cable loss compensation circuit includes compensation data 105 relating the cables 3a, 3b . . . 3n to a suitable amount of compensation. For instance, when a particular cable is detected, the compensation data 105 can include one or more compensation values for providing gain adjustment to the booster circuitry 11 to compensate for cable loss. Examples of compensation values include, but are not limited to, amounts of amplification and/or amounts of attenuation provided by controllable components of the booster circuitry 11.

Accordingly, the cable loss compensation circuit 104 provides a suitable amount of gain adjustment based on which cable is detected. For example, when a cable with an associated 5 dB of loss is present, the cable loss compensation circuit 104 can increase the booster circuitry's gain by about 5 dB. The cable loss compensation circuit 104 can be implemented in a wide variety of ways, such as using any suitable control circuit, such as a microcontroller, microprocessor, and/or digital controller. For instance, such a control circuit can be programmed with data corresponding to the compensation data 105.

In certain implementations, the cables 3a, 3b . . . 3n are included in a kit with other components of the signal booster system 110, such as the signal booster 102. Additionally, the user selects one of the cables 3a, 3b . . . 3n from the kit having a length suitable for a desired deployment of the signal booster system 110. In other implementations, one or more of the cables 3a, 3b . . . 3n are sold separately (for instance, individually), and a user purchases or otherwise acquires one or more of the cables.

Although the signal booster system 110 is illustrated as including the cable 4, in one embodiment the cable 4 is omitted in favor of integrating the second antenna 6 with the signal booster 102. In another embodiment, multiple cables of different lengths and identifiers can serve as the cable 4, and the signal booster 102 is further implemented to detect which cable is connected between the signal booster 102 and the second antenna 6, and to provide cable loss compensation based on the determination.

Figure 3A:
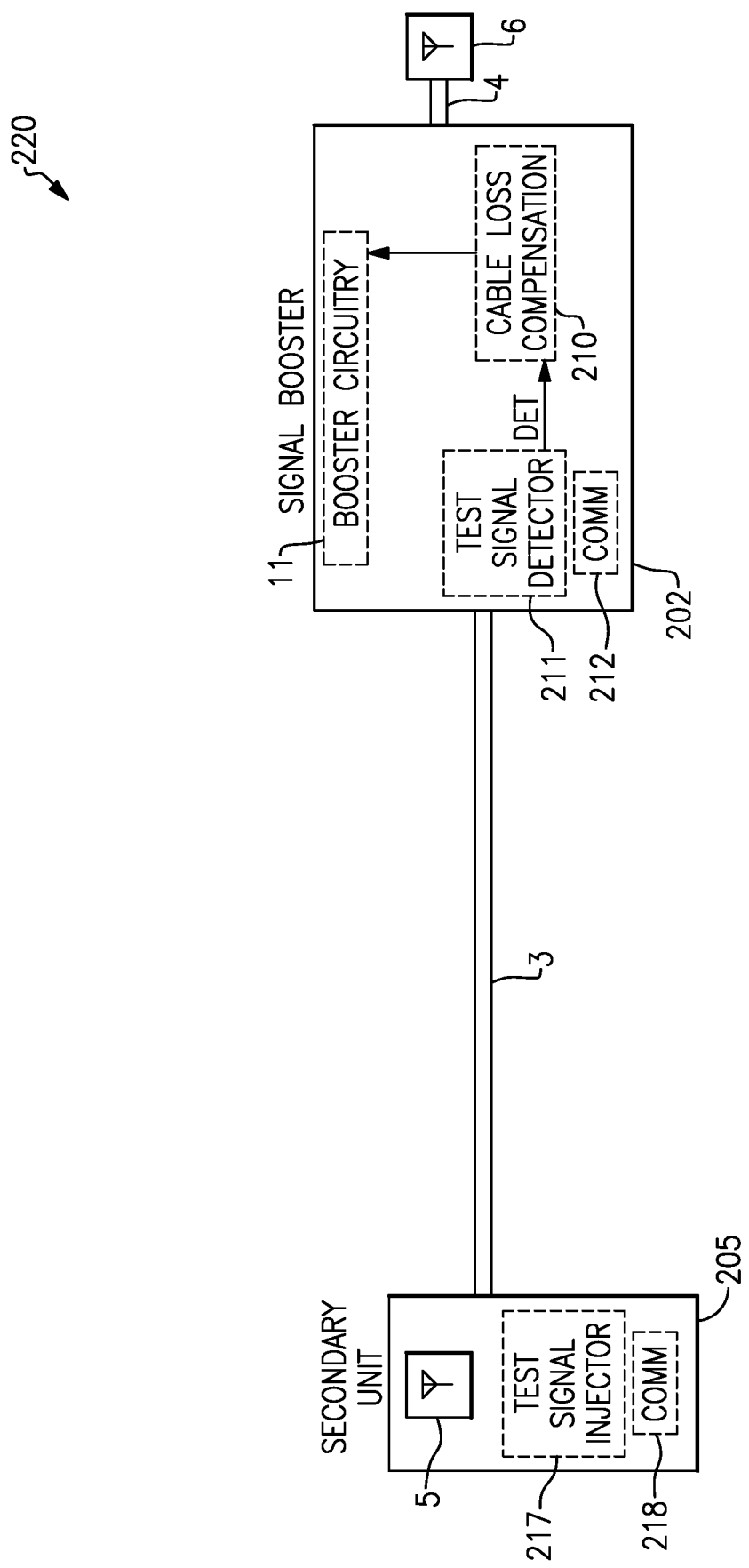
FIG. 3A is a schematic diagram of a signal booster system according to another embodiment.

FIG. 3A is a schematic diagram of a signal booster system 220 according to another embodiment. The signal booster system 220 includes a signal booster 202 and a secondary unit 205 connected by a first cable 3. The signal booster system 220 further includes a second antenna 6 connected to the signal booster 202 by a second cable 4. The signal booster 202 includes booster circuitry 11, a cable loss compensation circuit 210, a test signal detector 211, and a first data communication circuit 212. The secondary unit 205 includes a first antenna 5, a test signal injector 217, and a second data communication circuit 218.

Although FIG. 3A illustrates an embodiment in which the first antenna 5 is integrated with the secondary unit 205, in certain implementations the first antenna 5 is separated from the secondary unit 205. Furthermore, although the signal booster system 220 is illustrated as including the cable 4, in one embodiment the cable 4 is omitted in favor of integrating the second antenna 6 with the signal booster 202.

In the illustrated embodiment, the test signal injector 217 is positioned at or near a first end of the cable 3, and a test signal detector 211 is positioned at or near the second end of the cable 3, in this embodiment. However, the teachings herein are also applicable to implementations in which loss is detected over only a section or portion of a cable.

The test signal injector 217 operates to inject a test signal into one end of the cable 3, and the test signal detector 211 detects a signal level of the test signal at the other end of the cable. The detected signal level DET is used by the cable loss compensation circuit 210 to provide compensation for loss of the cable 3. For example, when the detected signal level DET indicates that the detected amount of loss is 5 dB, the cable loss compensation circuit 210 can increase a gain of the booster circuitry 11 by about 5 dB.

Thus, the illustrated signal booster system 220 can detect for and compensate for cable loss that is present. The cable loss is compensated based on actual signal loss present in a given deployment of the system, thereby aiding in achieving performance at or near maximum antenna-to-antenna gain permitted by FCC regulation.

The test signal injector 217 and the test signal detector 211 can be implemented in a wide variety of ways. For instance, example implementations of a signal detector include, but are not limited to, a peak power detector, an average power detector, a root mean square (RMS) power detector, a peak voltage detector, an average voltage detector, an RMS voltage detector, and/or a directional coupler. Furthermore, example implementations of a signal injector include, but are not limited to, a signal generator, an oscillator, and/or a phase-locked loop (PLL) or other frequency synthesizer.

In one embodiment, the test signal injector 217 includes an oscillator that generates a test tone of a particular frequency, and the test signal detector 211 includes a power detector for detecting a power of the test tone. In certain implementations, the test tone is of a frequency outside normal operating frequencies of the signal booster system 220, thereby permitting testing while the signal booster system 220 is in operation. However, other implementations are possible.

The cable loss compensation circuit 210 can provide a suitable amount of gain adjustment to the signal booster's amplification circuitry based on the detected amount of test signal loss along the cable. In certain implementations, cable loss is measured or detected at one or more signal frequencies, and the cable loss compensation circuit 210 extrapolates the loss to estimate cable loss at one or more other signal frequencies. In implementations in which the booster circuitry 11 includes multiple amplification paths (for instance, amplification paths associated with different frequency bands) different amounts of compensation can be provided for different amplification paths.

In the illustrated embodiment, the first data communication circuit 212 and the second data communication circuit 218 are included to coordinate test signal injection and detection. For example, the first data communication circuit 212 can be used to send a command for generating a test signal tone, and the second data communication circuit 218 can control the test signal injector 217 to inject the test signal in response to receiving the command. In certain implementations, the first data communication circuit 212 receives a return signal for initiating testing from the second data communication circuit 218.

In certain implementations, the first data communication circuit 212 and the second data communication circuit 218 communicate via the cable 3. In other implementations, the first data communication circuit 212 and the second data communication circuit 218 communicate wirelessly, for instance, using frequencies different from the signal frequencies amplified by the booster circuitry 11.

The first data communication circuit 212 and the second data communication circuit 218 can be implemented in a wide variety of ways, including, implementations using unidirectional communication or bidirectional communication. In certain implementations, the first data communication circuit 212 and the second data communication circuit 218 can each include a transceiver for bidirectional communication.

The signal booster system 220 can be implemented to test for cable loss at a wide variety of times. In a first example, the signal booster system 220 is implemented to test for cable loss as part of a turn-on or initialization sequence. In a second example, the signal booster system 220 detects cable loss by a calibration sequence during installation, and the detected cable loss is stored (for instance, in a non-volatile memory of the signal booster 202) for subsequent use in operation. In a third example, the signal booster system 220 is implemented to regularly test for cable loss during operation, thereby dynamically adjusting for cable loss to compensate for operating environment, such as temperature variation. Thus, in certain implementations, the signal booster system 220 dynamically compensates for variation in cable loss over time.

Figure 3B:
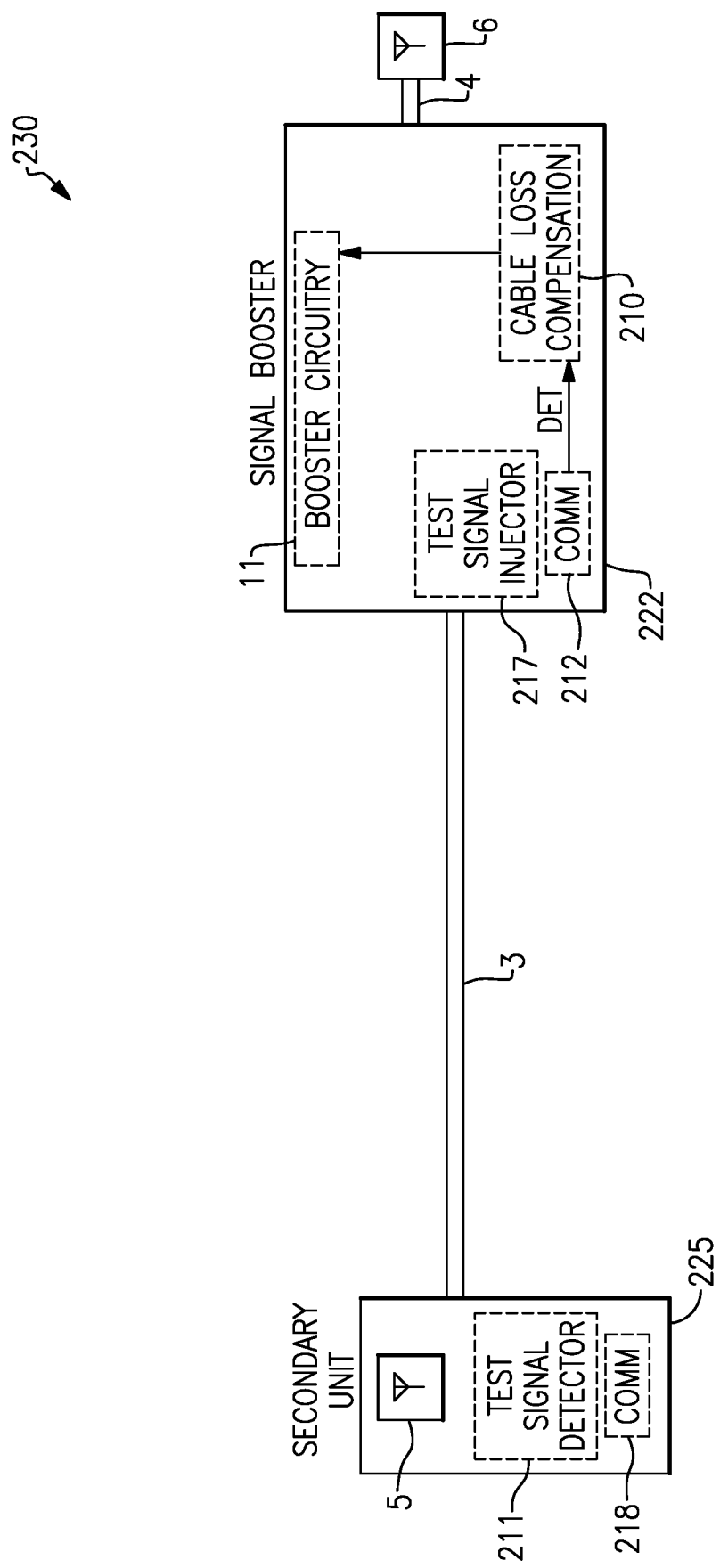
FIG. 3B is a schematic diagram of a signal booster system according to another embodiment.

FIG. 3B is a schematic diagram of a signal booster system 230 according to another embodiment. The signal booster system 230 of FIG. 3B is similar to the signal booster system 220 of FIG. 3A, except that the signal booster system 230 illustrates an implementation in which the position of the test signal detector 211 and the test signal injector 217 has been reversed.

For example, as shown in FIG. 3B, the signal booster 222 includes the test signal injector 217, while the secondary unit 225 includes the test signal detector 211. When testing for cable loss, the test signal injector 217 injects a test signal into one end of the cable 3, and the test signal detector 211 measures the corresponding signal level (for instance, power) of the test signal at the other end of the cable 3. Additionally, the second data communication circuit 218 transmits the detected signal level to the first data communication circuit 212, which in turn provides the detected signal level to the cable loss compensation circuit 210.

Additional details of the signal booster system 230 of FIG. 3B can be as described above with respect to the signal booster system 220 of FIG. 3A.

Figure 3C:
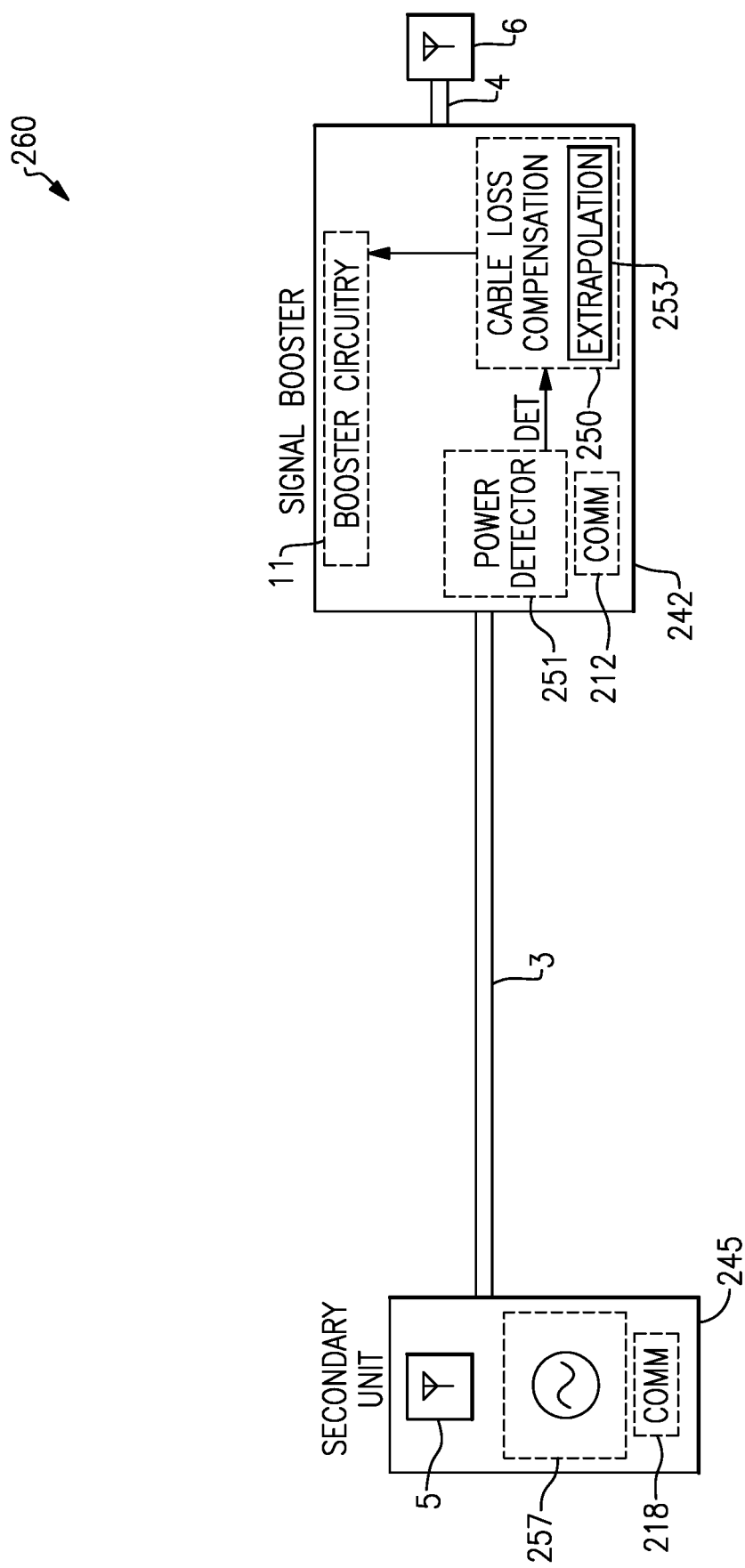
FIG. 3C is a schematic diagram of a signal booster system according to another embodiment.

FIG. 3C is a schematic diagram of a signal booster system 260 according to another embodiment. The signal booster system 260 of FIG. 3C is similar to the signal booster system 200 of FIG. 3A, except that the signal booster system 260 illustrates a specific implementation of a test signal injector and of a test signal detector. For example, the signal booster system 260 includes a secondary unit 245 including an oscillator 257 for generating a test signal tone of a particular test frequency, and a signal booster 242 including a power detector 251 that generates a detection signal DET based on detecting an observed power at the test frequency.

The signal booster 242 of FIG. 3C also includes a cable loss compensation circuit 250 including an extrapolation circuit or extrapolator 253 for extrapolation cable loss at one or more frequencies. For example the extrapolator 253 operates to extrapolate the cable loss observed at the test frequency to estimate cable loss at one or more different frequencies.

Figure 4A:
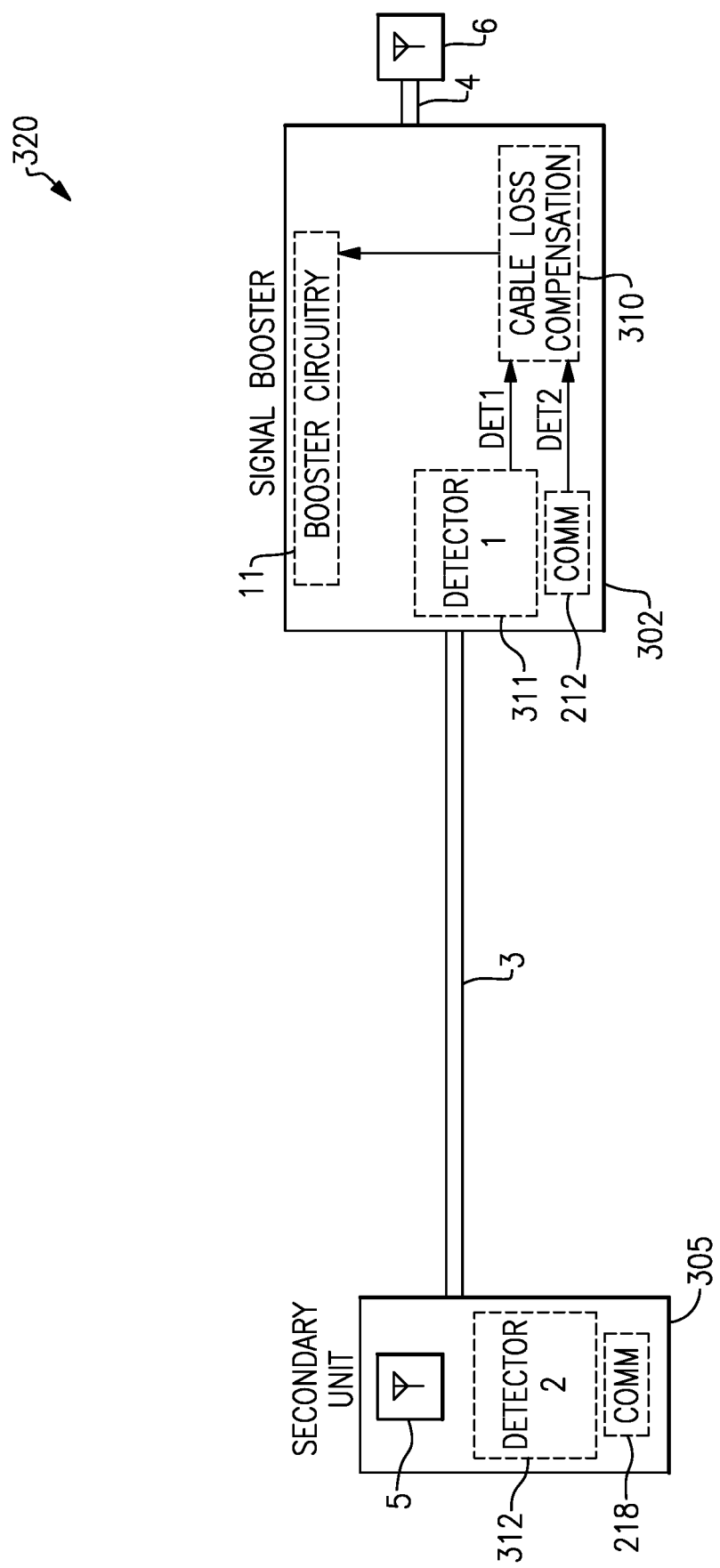
FIG. 4A is a schematic diagram of a signal booster system according to another embodiment.

FIG. 4A is a schematic diagram of a signal booster system 320 according to another embodiment. The signal booster system 320 includes a signal booster 302 and a secondary unit 305 connected by a first cable 3. The signal booster system 320 further includes a second antenna 6 connected to the signal booster 302 by a second cable 4. The signal booster 302 includes booster circuitry 11, a cable loss compensation circuit 310, a first signal detector 311, and a first data communication circuit 212. The secondary unit 305 includes a first antenna 5, a second signal detector 312, and a second data communication circuit 218.

Although FIG. 4A illustrates an embodiment in which the first antenna 5 is integrated with the secondary unit 305, in certain implementations the first antenna 5 is separated from the secondary unit 305. Furthermore, although the signal booster system 320 is illustrated as including the cable 4, in certain implementations the cable 4 is omitted in favor of integrating the second antenna 6 with the signal booster 302.

In the illustrated embodiment, the first signal detector 311 is positioned at or near a first end of the cable 3, and a second signal detector 312 is positioned at or near the second end of the cable 3. However, the teachings herein are also applicable to implementations in which loss is detected over only a section or portion of a cable.

The first signal detector 311 detects a signal level (for instance, power level) at one end of the cable 3, and the second signal detector 312 detects a signal level at the other end of the cable 3. The first detected signal level DET1 from the first signal detector 311 and the second detected signal level DET2 from the second signal detector 312 are used by the cable loss compensation circuit 310 to provide compensation for the amount of loss of the cable 3. Thus, the cable loss compensation circuit 310 detects for and compensates for cable loss that is present. The cable loss is compensated based on actual signal loss present in a given deployment of the system, thereby aiding in achieving performance at or near a maximum antenna-to-antenna gain permitted by FCC regulation.

The first signal detector 311 and the second signal detector 312 are used for detecting signal levels (for instance, signal powers) present at different positions of the cable 3. The detected signal levels DET1 and DET2 from the detectors are processed by the cable loss compensation circuit 310 to determine a difference in signal level and thus a signal loss arising from the cable 3.

The RF signal(s) monitored by the detectors 311 and 312 can include uplink and/or downlink signals of a cellular network. In one embodiment, an amplified RF signal being provided from the booster circuitry 11 to the first antenna 5 (for instance, an amplified or boosted downlink signal) is measured by the signal detectors 311 and 312.

The cable loss compensation circuit 310 can provide a suitable amount of gain adjustment to the signal booster's amplification circuitry on the difference in detected signal level of the detectors 311 and 312. In certain implementations, cable loss is measured or detected at one or more signal frequencies by the detectors 311 and 312, and the cable loss compensation circuit 310 extrapolates the loss to estimate cable loss at one or more other signal frequencies. In implementations in which the booster circuitry 11 includes multiple amplification paths (for instance, amplification paths associated with different frequency bands) different amounts of compensation can be provided for different amplification paths.

In the illustrated embodiment, the second data communication circuit 218 is used to transmit the second detected signal level DET2 from the second signal detector 312 to the first data communication circuit 212, which provides the second detected signal level DET2 to the cable loss compensation circuit 310. In certain implementations, the first data communication circuit 212 and second data communication circuit 218 communicate via the cable 3. Additionally or alternatively, the first data communication circuit 212 and second data communication circuit 218 communicate wirelessly, for instance, using frequencies different from the signal frequencies amplified by the booster circuitry 11.

The signal booster system 320 can be implemented to detect cable loss at a wide variety of times, including, for example, during normal operation of the signal booster system 320. For example, the signal booster system 320 can regularly test for cable loss during operation, thereby dynamically adjusting for cable loss to compensate for operating environment, such as temperature variation. Thus, in certain implementations, the signal booster system 320 dynamically compensates for variation in cable loss over time.

Figure 4B:
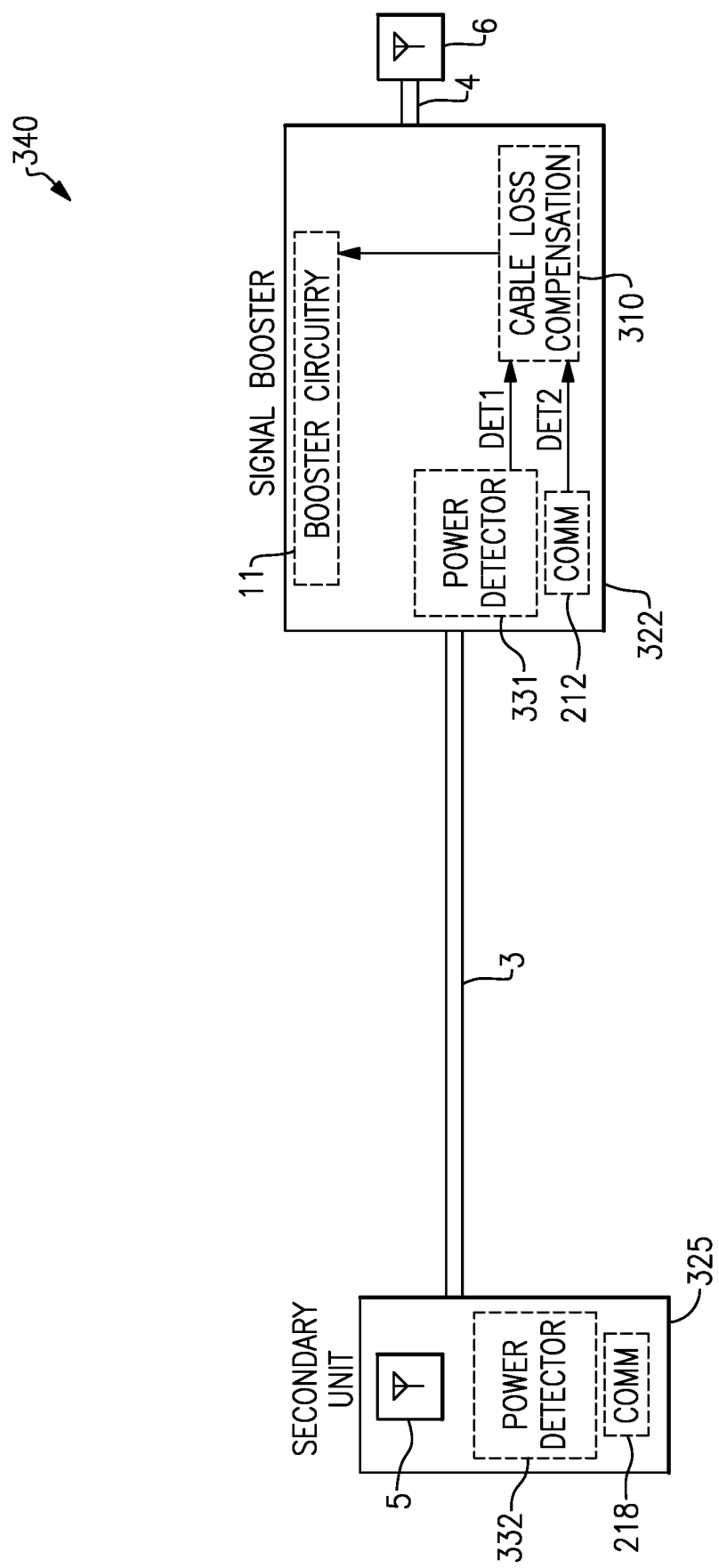
FIG. 4B is a schematic diagram of a signal booster system according to another embodiment.

FIG. 4B is a schematic diagram of a signal booster system 340 according to another embodiment. The signal booster system 340 of FIG. 4B is similar to the signal booster system 320 of FIG. 4A, except that the signal booster system 340 includes specific implementations of detectors. For example, the signal booster system 340 includes a signal booster 322 including a first power detector 331 and a secondary unit 325 including a second power detector 332.

Figure 5A:
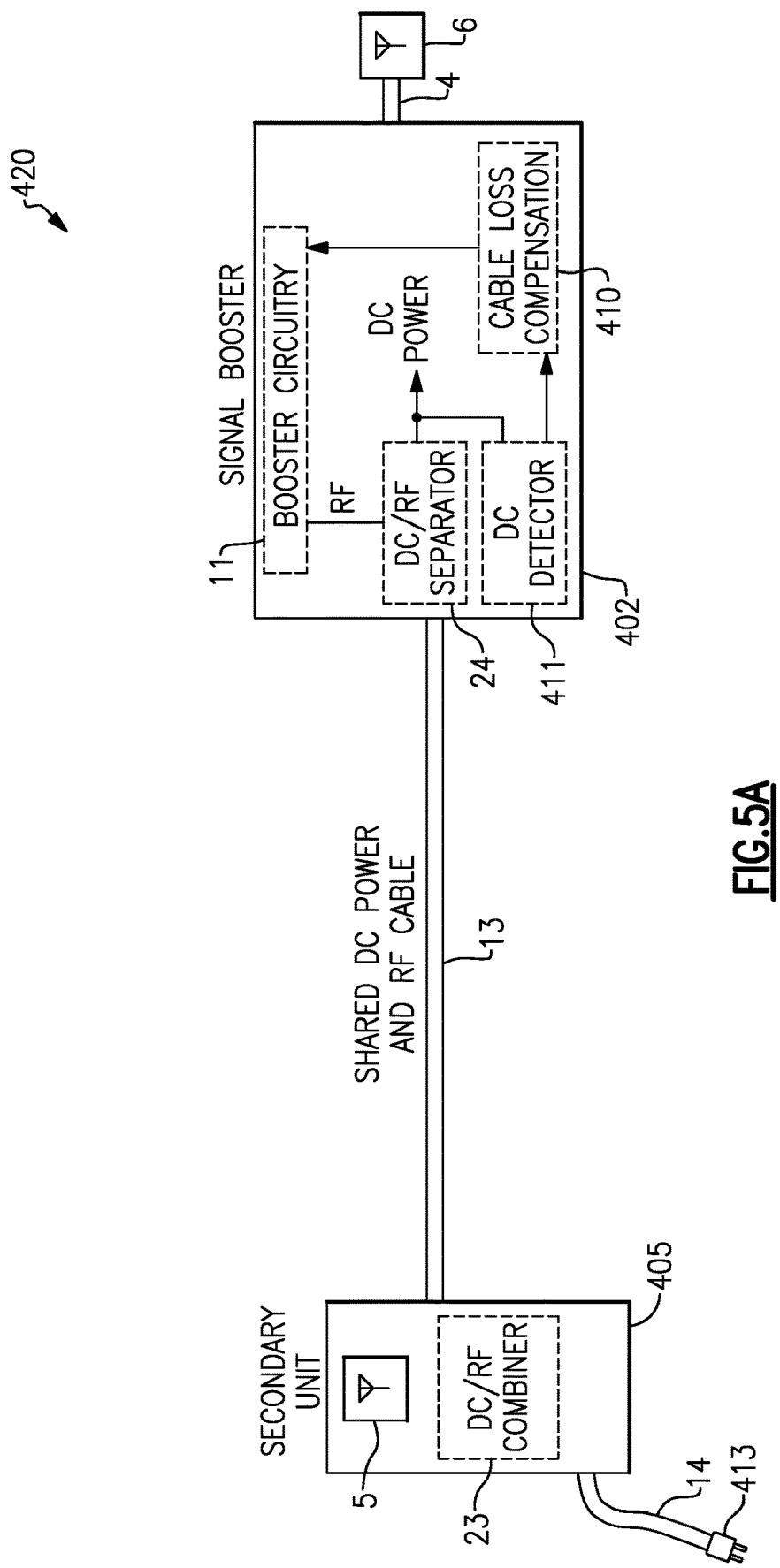
FIG. 5A is a schematic diagram of a signal booster system according to another embodiment.

FIG. 5A is a schematic diagram of a signal booster system 420 according to another embodiment. The signal booster system 420 includes a signal booster 402 and a secondary unit 405 connected by a shared DC power and RF cable 13. The signal booster system 420 further includes a second antenna 6 connected to the signal booster 402 by a cable 4. The signal booster 402 includes booster circuitry 11, a DC/RF separator 24, a cable loss compensation circuit 410, and a DC detector 411. The secondary unit 405 includes a first antenna 5 and a DC/RF combiner 23, and receives power from a power cable 14.

Although FIG. 5A illustrates an embodiment in which the first antenna 5 is integrated with the secondary unit 405, in certain implementations the first antenna 5 is separated from the secondary unit 405. Furthermore, although the signal booster system 420 is illustrated as including the cable 4, in one embodiment the cable 4 is omitted in favor of integrating the second antenna 6 with the signal booster 402.

The shared DC power and RF cable 13 is used not only for communicating RF signals, but also for providing power to the signal booster 402. Thus, the signal booster 402 receives power from the cable 13. In the illustrated embodiment, the cable 13 a shared DC and RF power cable including a common conductor that carries both DC power and RF signals. In another embodiment, the signal booster system 420 is modified to include a complex cable bundling separate cables for RF signals and power.

The DC detector 411 detects a DC voltage level of power received from the cable 13. Additionally, the cable loss compensation circuit 410 processes the detected DC voltage to estimate a loss of the cable 13, and to provide gain adjustment to the booster circuitry 11 to compensate for the estimated cable loss.

In certain implementations, the secondary unit 405 provides a DC supply voltage of controlled voltage level to signal booster 402 via the cable 13. For example, the secondary unit 405 can provide voltage regulation or receive a regulated voltage. In certain implementations, such voltage regulation is provided by the secondary unit 405 and/or by an adapter 413 of the power cable 14.

In such implementations, a difference between an assumed voltage level and the voltage level detected by the DC detector 411 can be used to detect a DC voltage drop across the cable 13. In another embodiment, the secondary unit 405 includes a second DC detector that serves to detect a DC voltage level of the cable 13 at the secondary unit 405, and the cable loss compensation circuit 410 estimates the loss of the cable based on the output of both DC detectors, corresponding to a DC voltage drop across the cable 13.

In certain configurations, the cable loss compensation circuit 20 includes data relating a detected DC voltage (for instance, a detected DC voltage drop across at least a portion of the cable 13) to a suitable amount of compensation. For instance, when the output of the DC detector 411 indicates that a particular DC voltage or DC voltage drop is detected, the compensation data can include one or more compensation values for providing gain adjustment to the booster circuitry 11 to compensate for cable loss. Examples of compensation values include, but are not limited to, amounts of amplification and/or amounts of attenuation provided by controllable components of the booster circuitry 11.

In one embodiment, the signal booster system 420 further includes a current detector operable to detect a current (for instance, an average DC current) flowing through the cable 13, and the voltage detected by the DC detector 411 and the detected current are used to estimate loss of the cable 13.

Figure 5B:
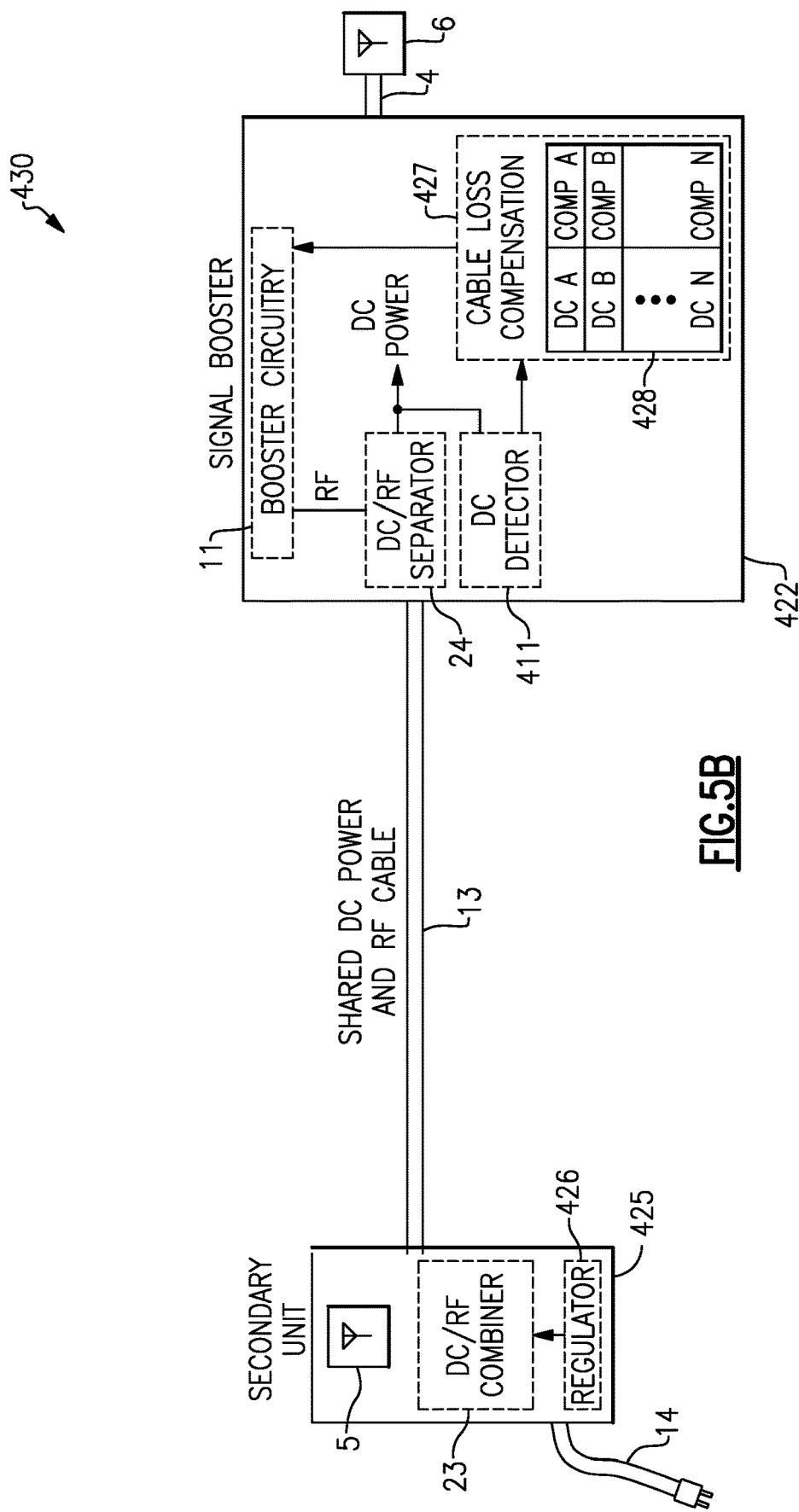
FIG. 5B is a schematic diagram of a signal booster system according to another embodiment.

FIG. 5B is a schematic diagram of a signal booster system 430 according to another embodiment. The signal booster system 430 of FIG. 5B is similar to the signal booster system 420 of FIG. 5A, except that the signal booster system 430 illustrates a specific implementation of cable loss compensation based on detected DC voltage drop.

For example, the signal booster system 430 includes a secondary unit 425 including a voltage regulator 426 for regulating a DC voltage at the secondary unit 425. Including the voltage regulator 426 enhances accuracy of DC voltage drop detection by controlling the DC voltage level at one of end of the cable 13 to a regulated voltage level.

As shown in FIG. 5B, the signal booster system 430 includes a signal booster 422 including a cable loss compensation circuit 427. In this embodiment, the cable loss compensation circuit 427 includes compensation data 428 relating detected DC voltages to corresponding compensation values for providing compensation for cable loss.

Figure 5C:
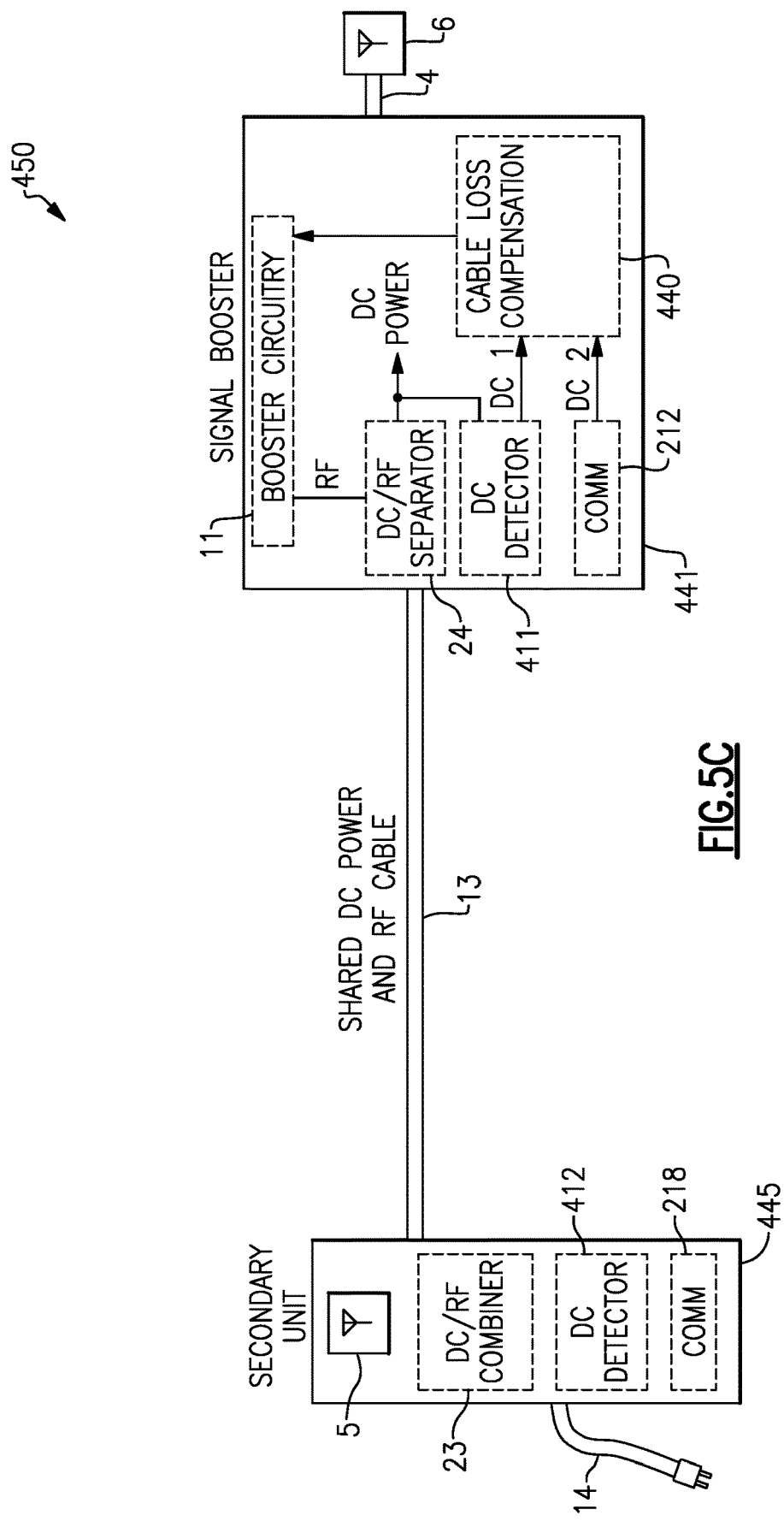
FIG. 5C is a schematic diagram of a signal booster system according to another embodiment.

FIG. 5C is a schematic diagram of a signal booster system 450 according to another embodiment. The signal booster system 450 of FIG. 5C is similar to the signal booster system 420 of FIG. 5A, except that the signal booster system 450 illustrates an implementation including multiple DC detectors.

For example, the signal booster system 450 includes a signal booster 441 including a first DC detector 411 that provides a cable loss compensation circuit 440 with a first detected DC voltage. Additionally, the signal booster system 450 includes a secondary unit 445 including a second DC detector 412 which outputs a second detected DC voltage. In this embodiment, the secondary unit 445 also includes a data communication circuit 218 that communicates with a data communication circuit 212 of the signal booster 441 to thereby provide the second detected DC voltage to the cable loss compensation circuit 440.

Thus, the cable loss compensation circuit 440 determines the DC voltage drop based on a difference between the first and second DC detection signals, in this embodiment.

Figure 5D:
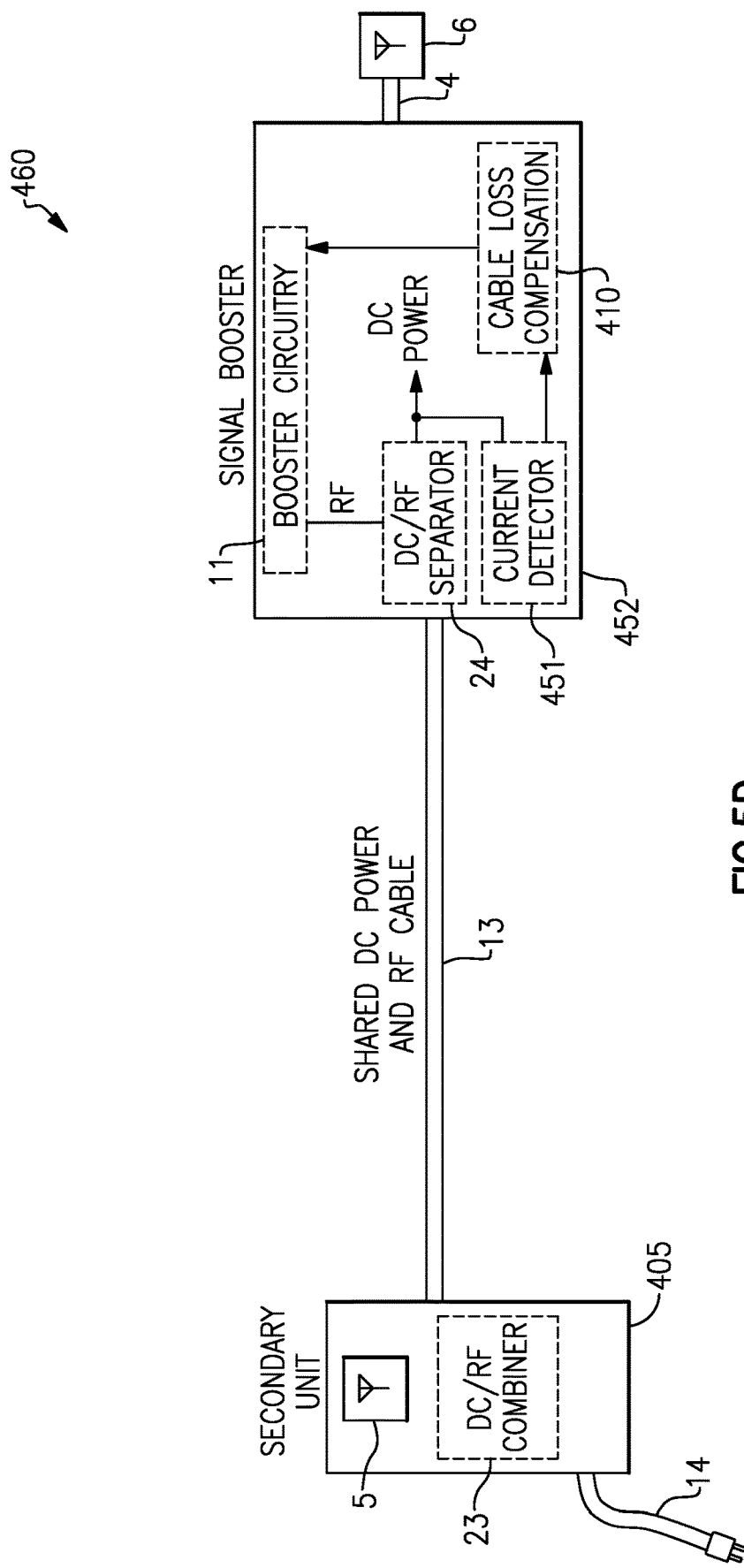
FIG. 5D is a schematic diagram of a signal booster system according to another embodiment.

FIG. 5D is a schematic diagram of a signal booster system 460 according to another embodiment. The signal booster system 460 of FIG. 5D is similar to the signal booster system 420 of FIG. 5A, except that the signal booster system 460 uses current detection to provide compensation for cable loss.

For example, the signal booster system 460 includes a signal booster 452 including a current detector 451. The current detector 451 is operable to detect a current (for instance, an average DC current) flowing through the cable 13, and the detected current is used for estimating loss of the cable 13. In certain implementations, the DC detector 411 of FIG. 5A is also included in the signal booster 452, and both the detected current and the detected DC voltage are used to estimate loss of the cable 13.

Figure 6A:
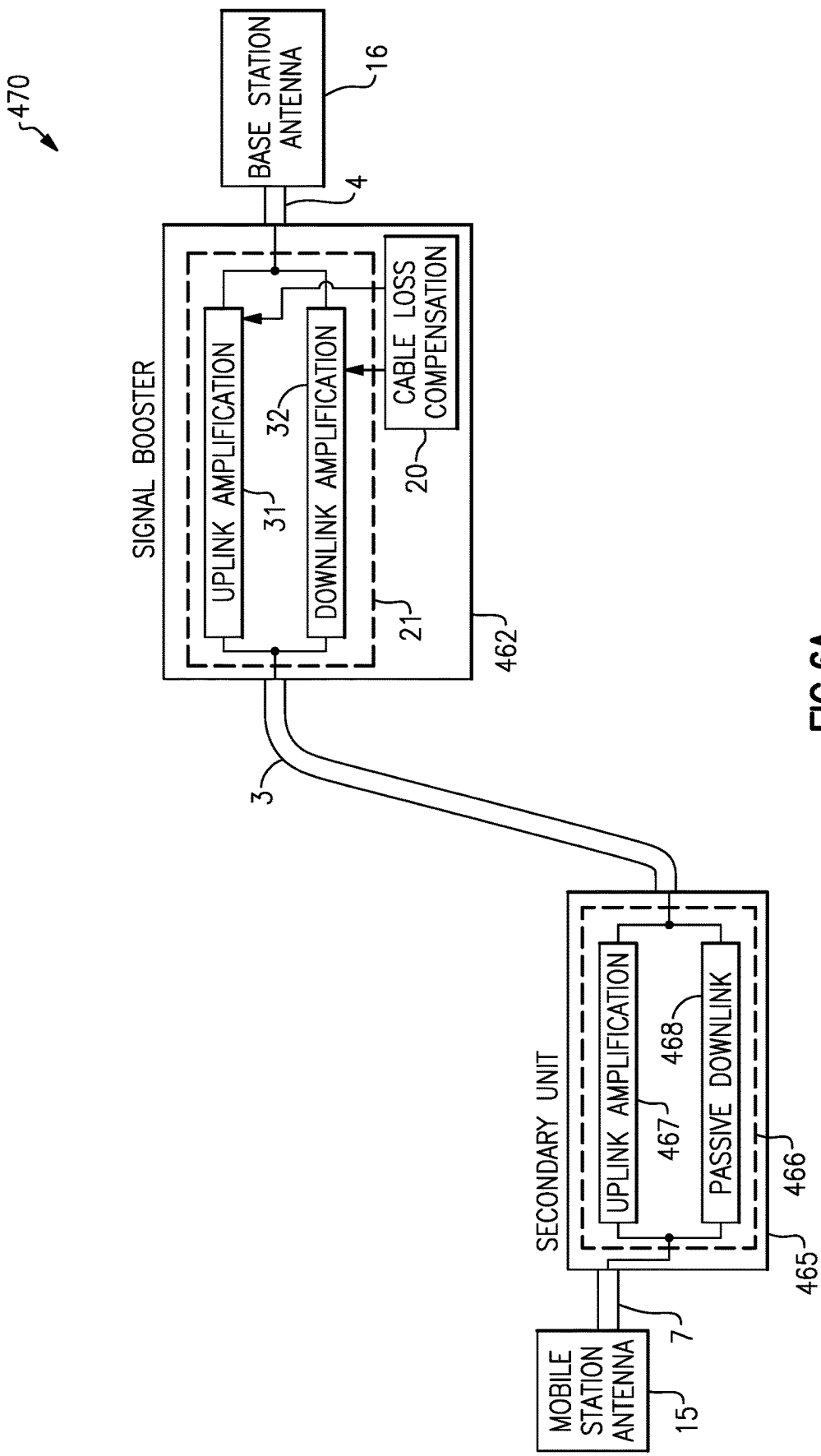
FIG. 6A is a schematic diagram of a signal booster system according to another embodiment.

FIG. 6A is a schematic diagram of a signal booster system 470 according to another embodiment. The signal booster system 470 includes a first cable 3, a second cable 4, a third cable 7, a mobile station antenna 15, a base station antenna 16, a signal booster 462, and a secondary unit 465. The signal booster 462 includes a cable loss compensation circuit 20 and booster circuitry 21. The cable loss compensation circuit 20 can be implemented in accordance with any of the cable loss compensation schemes herein. As shown in FIG. 6A, the secondary unit 465 includes booster circuitry 466.

The booster circuitry 466 of the secondary unit 465 aids in sending RF signals to the signal booster 462. Accordingly, in certain implementations herein, booster circuitry is included not only in a signal booster, but also in a secondary unit.

In the illustrated embodiment, the booster circuitry 466 includes an uplink amplification circuit 467 and a passive downlink circuit 468. However, the teachings herein are also applicable to configurations in which a secondary unit additionally or alternatively includes amplification circuitry for amplifying downlink signals. In one embodiment, the secondary unit further includes a cable loss compensation circuit for compensating for loss of the cable 3. Such a cable loss compensation circuit can be implemented in accordance with any of the cable loss compensation schemes herein.

Although FIG. 6A illustrates an embodiment in which the mobile station antenna 15 is connected to the secondary unit 465 by the cable 7, in other implementations the mobile station antenna 15 is integrated with the secondary unit 465 and the cable 7 is omitted. Furthermore, although the signal booster system 470 is illustrated as including the cable 4, in other implementations the cable 4 is omitted in favor of integrating the second antenna 6 with the signal booster 462.

Figure 6B:
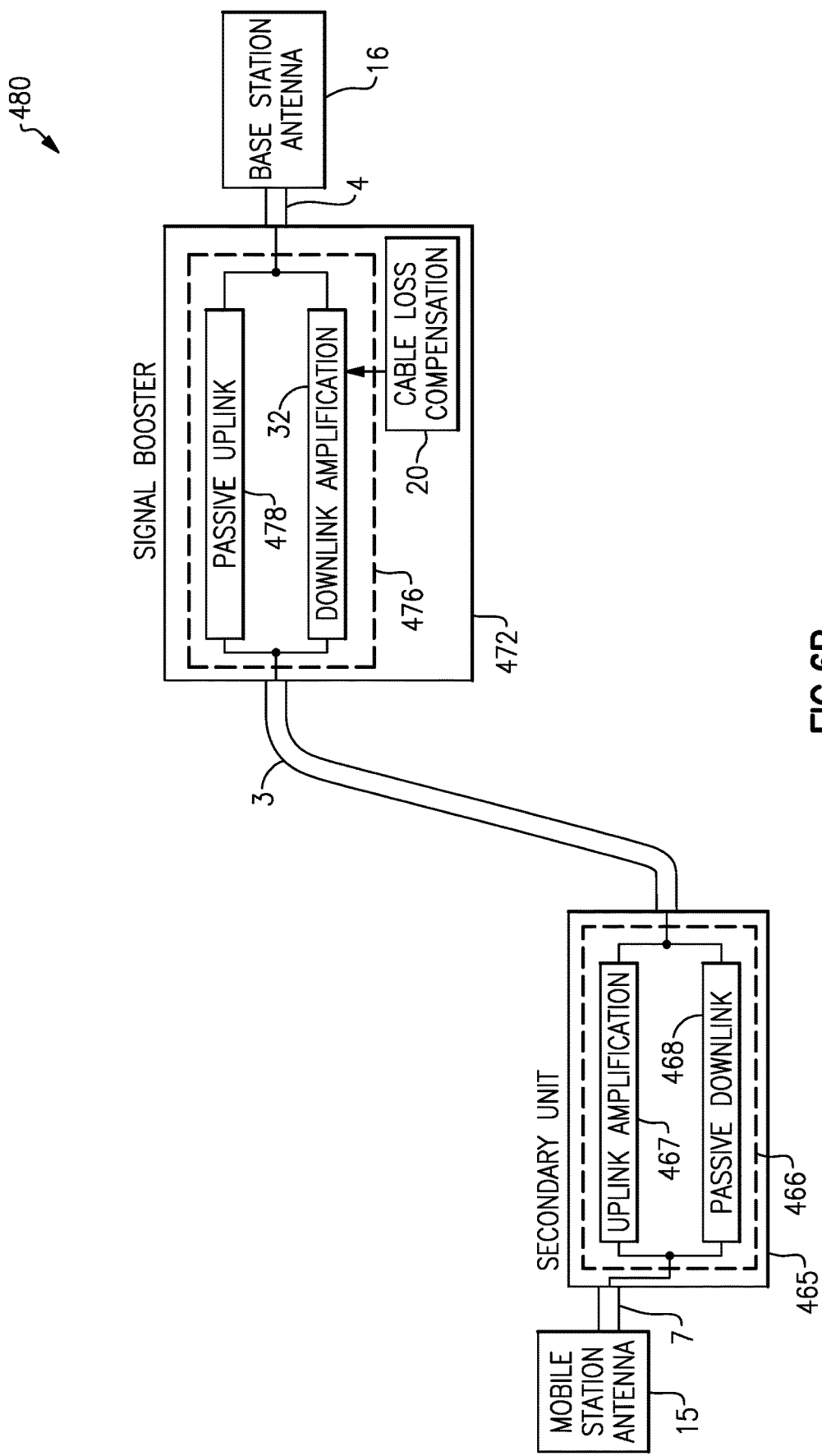
FIG. 6B is a schematic diagram of a signal booster system according to another embodiment.

FIG. 6B is a schematic diagram of a signal booster system 480 according to another embodiment. The signal booster system 480 of FIG. 6B is similar to the signal booster system 470 of FIG. 6A, except that the signal booster system 480 includes a signal booster 472 with a different implementation of booster circuitry 476. In particular, the booster circuitry 476 of FIG. 6B includes a downlink amplification circuit 32 and a passive uplink circuit 478. Thus, in this example, the signal booster 472 provides amplification to downlink signals received by the base station antenna 16, but does not provide amplification to uplink signals received over the cable 3. In the illustrated embodiment, the cable loss compensation circuit 20 controls a gain of the downlink amplification circuit 32 to compensate for cable loss.

Figure 6C:
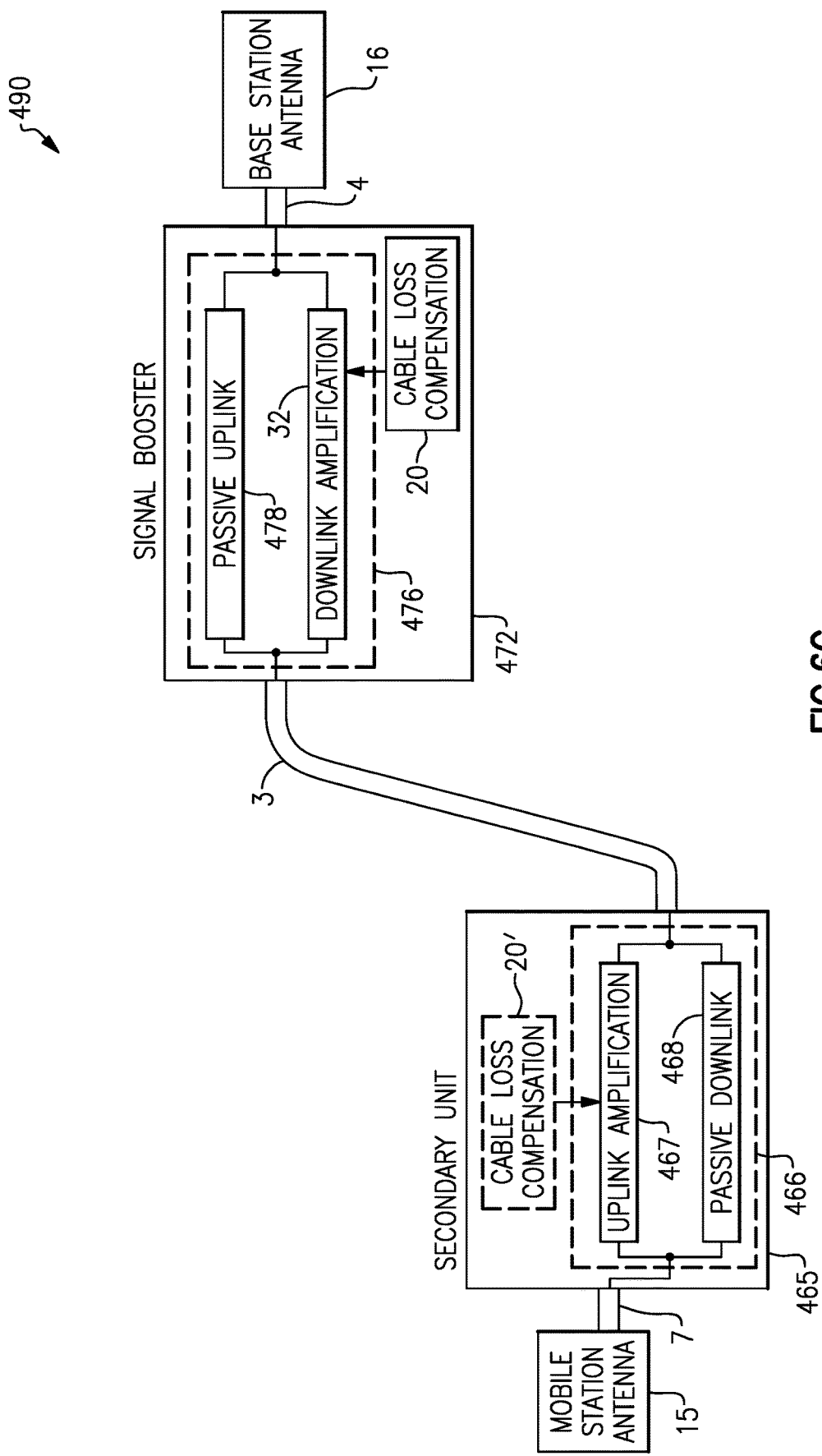
FIG. 6C is a schematic diagram of a signal booster system according to another embodiment.

FIG. 6C is a schematic diagram of a signal booster system 490 according to another embodiment. The signal booster system 490 of FIG. 6C is similar to the signal booster system 480 of FIG. 6B, except that the signal booster system 490 includes a secondary unit 465' that further includes a cable loss compensation circuit 20'.

In the illustrated embodiment, the cable loss compensation circuit 20' provides gain adjustment to the uplink amplification circuit 467 to compensate for loss of the cable 3. The cable loss compensation circuit 20' in accordance with any of the cable loss compensation schemes disclosed herein. Although FIG. 6C illustrates an implementation in which a cable loss compensation circuit of a secondary unit adjusts a gain of an uplink amplification circuit, a cable loss compensation circuit of a secondary unit can also provide gain adjustment to a downlink amplification circuit or to both an uplink amplification circuit and a downlink amplification circuit.

Figures 7, 8:
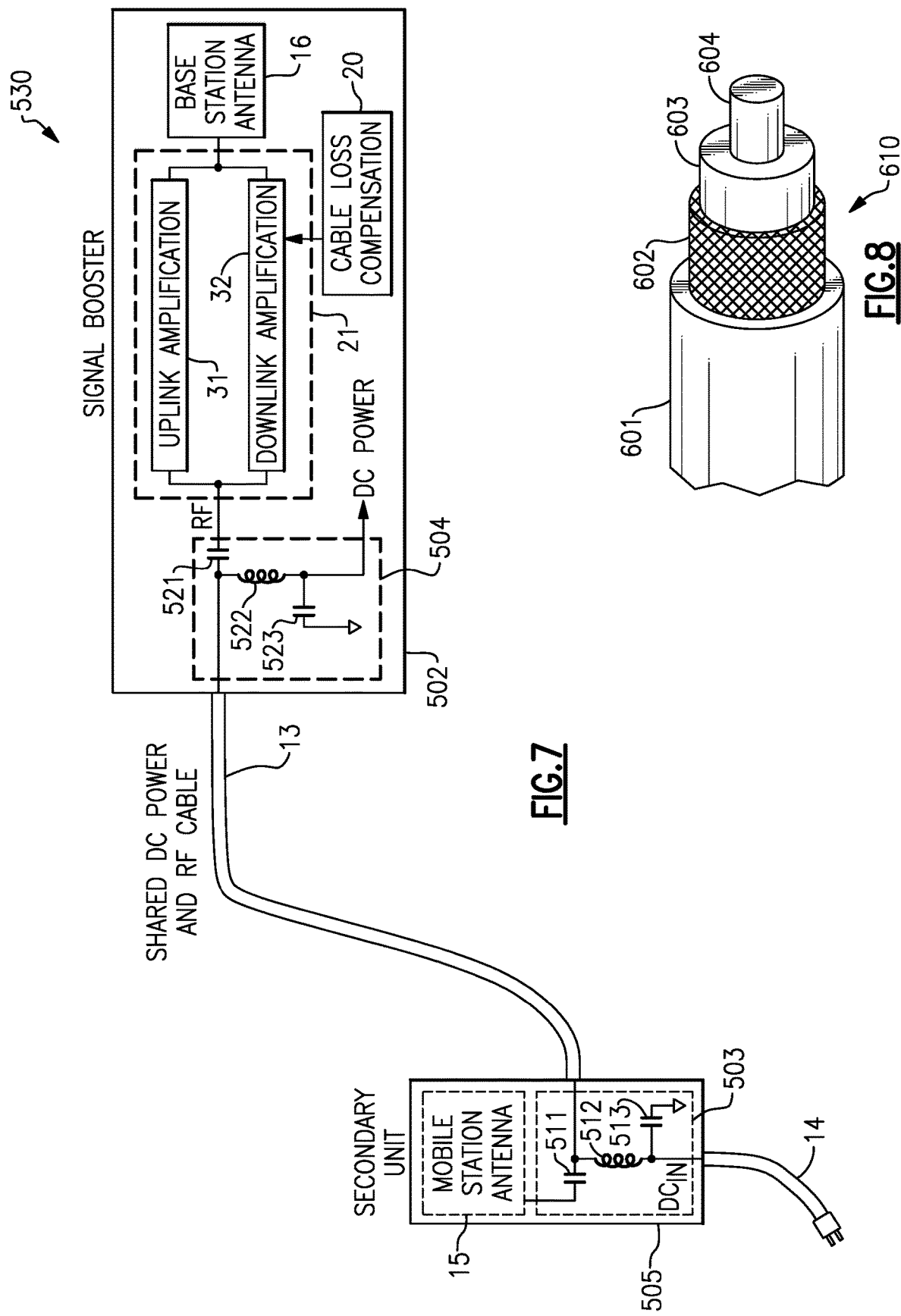
FIG. 7 is a schematic diagram of a signal booster system including circuitry for connecting to a shared DC power and RF cable, according to another embodiment.
FIG. 8 is a perspective view of one example of a shared DC power and RF cable for a signal booster system.

FIG. 7 is a schematic diagram of a signal booster system 530 including circuitry for connecting to a shared DC power and RF cable, according to another embodiment. As shown in FIG. 7, the signal booster system 530 includes a shared DC power and RF cable 13, a signal booster 502, and a secondary unit 505.

The secondary unit 505 of FIG. 7 is similar to the secondary unit 55 of FIG. 1D, except that the secondary unit 505 further includes an isolator/combiner circuit 503, which corresponds to one embodiment of the DC/RF combiner 23 of FIG. 1D. As shown in FIG. 7, the isolator/combiner circuit 503 includes a DC blocking capacitor 511, an RF choke inductor 512, and a decoupling capacitor 513. The isolator/combiner circuit 503 serves to combine a DC input voltage $DC_{IN}$ with an RF signal associated with the indoor mobile station antenna 15 while providing isolation.

The signal booster 502 of FIG. 7 is similar to the signal booster 52 of FIG. 1D, except that the signal booster 502 includes an isolator/separator circuit 504, which corresponds to one embodiment of the DC/RF separator 24 of FIG. 1D. The isolator/separator circuit 504 includes a DC blocking capacitor 521, an RF choke inductor 522, and a decoupling capacitor 523.

The shared DC power and RF cable 13 carries an RF voltage superimposed on a DC supply voltage. Thus, the shared DC power and RF cable 13 carries DC power provided at the input $DC_{IN}$ to the signal booster 502 as well as RF signals associated with wireless communications of the mobile station antenna 15.

In certain implementations, the input $DC_{IN}$ receives a DC voltage generated from a building's power source. For example, an adapter of the power cable 14 can provide AC to DC conversion to generate the DC input voltage $DC_{IN}$ provided to the isolator/combiner circuit 503. In certain implementations, the DC input voltage $DC_{IN}$ is a regulated voltage.

Although one embodiment of circuitry for connecting to a shared DC power and RF cable is shown, other implementations are possible.

FIG. 8 is a perspective view of one example of a shared DC power and RF cable 610 for a signal booster system. In this example, the shared DC power and RF cable 610 is implemented as a coaxial cable including outside insulation 601, metal mesh conductor 602, interior insulation 603, and metal inner conductor 604.

The outside insulation 601 protects the coaxial cable from external friction, interference, or damage. The metal mesh conductor 602 aids in containing signal leakage from metal inner conductor 604 and also shields the signal transmitted on the metal inner conductor 604 from external electric and/or magnetic fields while serving as ground.

In the illustrated embodiment, the metal mesh conductor 602 carries a ground voltage to a signal booster, and the metal inner conductor 604 carries an RF voltage superimposed on a DC supply voltage. Thus, a common conductor carries both DC power and RF signals, in this embodiment.

The shared DC power and RF cable 610 illustrates one embodiment of a shared DC power and RF cable that can be used for carrying both RF signals and DC supply voltage to a signal booster. In another embodiment, a pair of separate cables are physically bundled together (referred to herein as a complex or composite cable) to carry RF and DC power, respectively. However, the teachings herein are application to other implementations of shared DC power and RF cables, as well as to signal booster systems that do not include a shared DC power and RF cable.

Figure 9A:
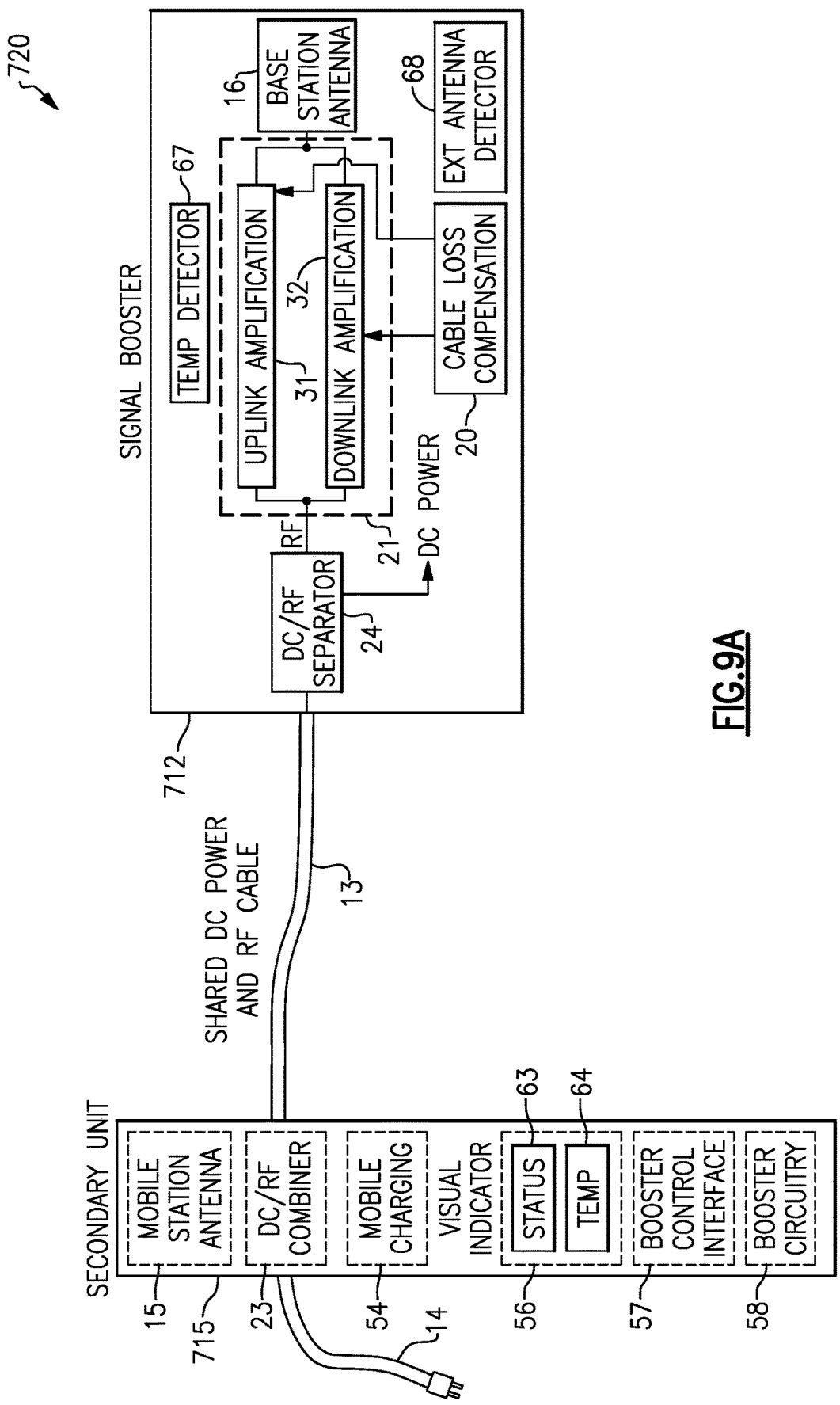
FIG. 9A is a schematic diagram of a signal booster system according to another embodiment.

FIG. 9A is a schematic diagram of a signal booster system 720 according to another embodiment. The signal booster system 720 includes a shared DC power and RF cable 13, a power cable 14, a signal booster 712, and a secondary unit 715.

The secondary unit 715 of FIG. 9A is similar to the secondary unit 55 of FIG. 1D, except that the secondary unit 715 further includes a mobile charging circuit 54, a visual indicator 56, a booster control interface 57, and booster circuitry 58.

The mobile charging circuit 54 is operable to charge a battery of a user's mobile device. In one example, a charging cable is provided from the secondary unit 715 to the mobile device, and the charging circuit 54 charges the mobile device's battery via the charging cable. In another example, a mobile device can be coupled to the secondary unit 715 and the mobile charging circuit 54 provides wireless charging.

The visual indicator 56 can include one or more displays, lights, or other visual indications to alert a user to the status of operation of the signal booster system 720. In one embodiment, the visual indicator 56 includes at least one of a light-emitting diode (LED) or a display, such as a liquid crystal display (LCD).

In the illustrated embodiment, the visual indicator 56 includes a status indicator 63 and a temperature indicator 64. Although one example of visual indicators is shown, a secondary unit can be configured to display other types of status information related to the operation of the signal booster system 720. The status indicator 63 indicates the status of the signal booster 720, including, but not limited to, whether the signal booster is powered, whether boosting is active for one or more bands, antenna status, and/or whether oscillation/pre-oscillation has occurred. The temperature indicator 64 indicates a temperature of the signal booster 712, as detected by the signal booster's temperature detector and/or whether the booster is operating with backed-off performance because of high temperature. In one embodiment, a temperature alarm is alerted when a high temperature condition is present.

The booster control interface 57 can be used to control the signal booster 712 in a wide variety of ways. Examples of types of control provided by the booster control interface 57 include, but are not limited to, remote shut-down or power control, remote control of gain and/or attenuation (including, for example, band specific control), and/or remote control of antenna selection (for instance, in multi-antenna configurations). Including the booster control interface 57 allows a user indoors to control the signal booster 712 without needing to be physically present at the signal booster 712, which may be inconvenient for the user to access.

The booster circuitry 58 can be implemented to provide additional uplink and/or downlink amplification. For instance, the booster circuitry 58 can be implemented using the booster circuitry 466 of FIGS. 6A and 6B or using other suitable booster circuitry.

The signal booster 712 of FIG. 9A is similar to the signal booster 52 of FIG. 1D, except that the signal booster 712 further includes a temperature detector 67 and an external antenna detector 68.

The temperature detector 67 detects the temperature of the signal booster 712, which can be placed outdoors and exposed to sunlight. In one embodiment, when a high temperature condition is detected (for instance, a temperature of about 120 degrees Fahrenheit or higher), the signal booster 712 automatically adjusts performance (for instance, decreases gain) to protect from overheating. Such backed-off performance can be communicated to the user via the visual indicator 56.

The external antenna detector 68 detects whether or not an external base station antenna (not shown in FIG. 9A) has been connected to the signal booster. In one embodiment, when the external antenna detector 68 detects that an external base station antenna is connected, the external antenna detector 68 disables the integrated base station antenna 16 in favor of using the external base station antenna for communications. When an external antenna is present, the signal booster 712 can detect output power of the antenna to ensure that output power does not exceed FCC effective isotropic radiated power (EIRP) limits and/or other regulatory limitation or specification.

Figure 9B:
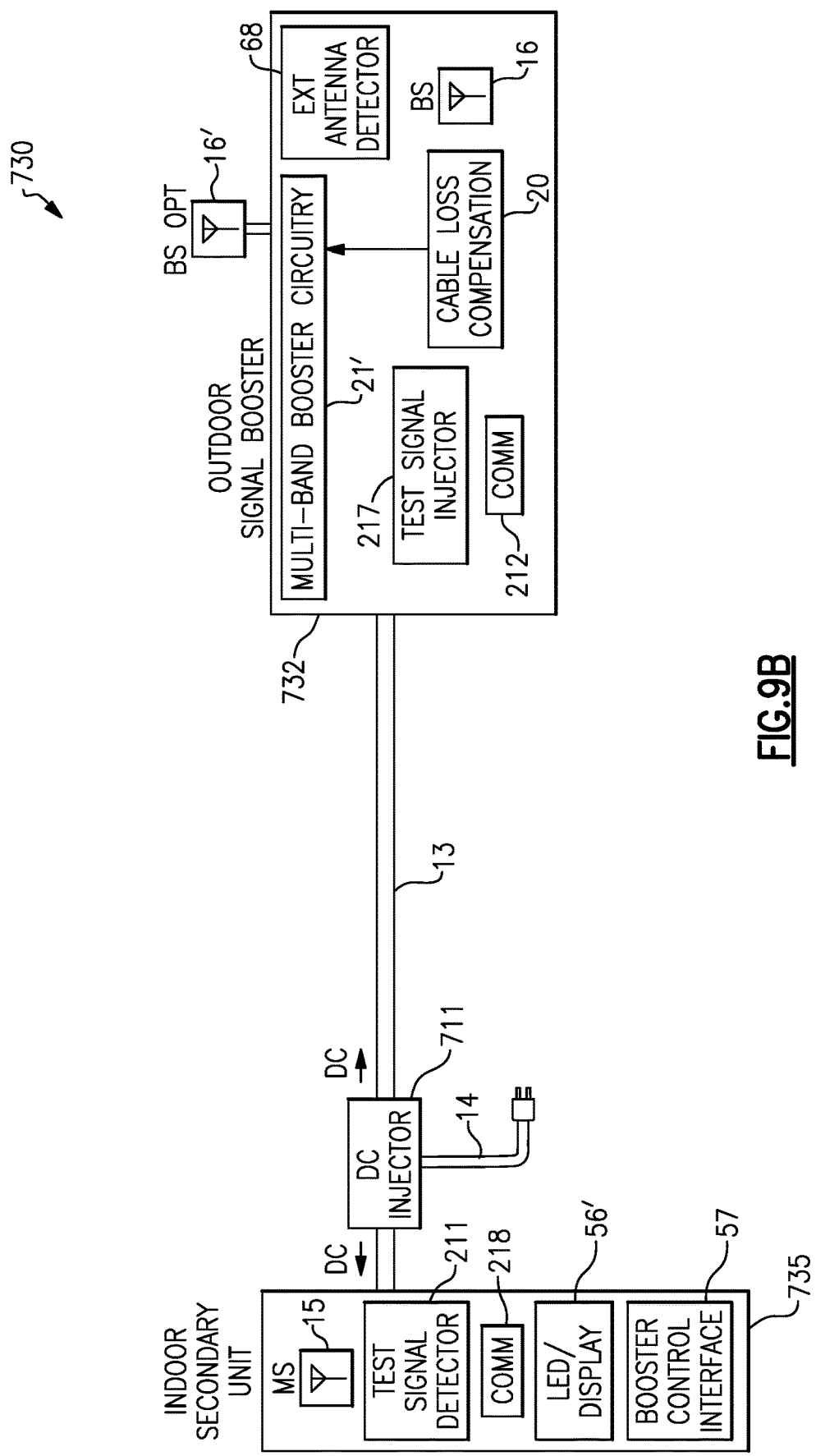
FIG. 9B is a schematic diagram of a signal booster system according to another embodiment.

FIG. 9B is a schematic diagram of a signal booster system 730 according to another embodiment. The signal booster system 730 includes a shared DC power and RF cable 13, a power cable 14, a DC injector 711, an outdoor signal booster 712, and an indoor secondary unit 715.

The outdoor signal booster 732 includes a base station antenna 16, a cable loss compensation circuit 20, multi-band booster circuitry 21', an external antenna detector 68 (for detecting an external base station antenna 16', a test signal injector 217, and a first data communication circuit 212. In one embodiment, the outdoor signal booster 732 is implemented in a single housing configured for integration on an exterior surface of a building, such as on a roof or wall.

The multi-band booster circuitry 21' is implemented to provide uplink and downlink amplification of two or more frequency bands (for instance, 3GPP frequency bands), including, but not limited to, Band 5, Band 12, Band 13, Band 71, Band 30, Band 2, Band 4, or any combination thereof. Any of the signal booster systems disclosed herein can be implemented with the multi-band booster circuitry 21'.

As shown in FIG. 9B, the cable loss compensation circuit 20 provides gain adjustment to one or more uplink and/or downlink circuits of the multi-band booster circuitry 21'. In certain implementations, the gain adjustment is band specific, thereby providing cable loss compensation tailored to each frequency band. Since cable loss typically increases with frequency, providing band specific cable loss compensation can provide superior performance relative to an implementation using the same gain adjustment for each frequency band.

The indoor secondary unit 735 includes a mobile station antenna 15, LED and/or display (LED/display) indicator 56', a booster control interface 57, a second data communication circuit 218, and a test signal detector 211. In one embodiment, the indoor secondary unit 735 is implemented in a single housing configured for installation in an interior of a building.

In the illustrated embodiment, the DC injector 711 is integrated along a length of the cable 13, and receives power from an outlet via the power cable 14. Additionally, the DC injector 711 provides DC power to both the indoor secondary unit 735 and to the outdoor signal booster 732. Using the DC injector 711 in this manner reduces cable congestion of the indoor secondary unit. For instance, a single cable can be connected to the indoor secondary unit 735 and used for carrying both DC and RF.

FIG. 10A is a schematic diagram of a mobile network 960 according to one embodiment. The mobile network 960 includes a signal booster system 950, a base station 951 (one shown, in this example), and mobile devices 953a-953c (three shown, in this example). The signal booster system 950 includes a secondary unit 941, an outdoor signal booster 942, a power and RF cable 943, and a power cable 945. For clarity of the figures, internal circuitry and components of the secondary unit 941 and the outdoor signal booster 942 are not shown in FIG. 10A.

The signal booster system 950 is implemented in accordance with one or more of the features as described herein. For example, the secondary unit 941 and/or the outdoor signal booster 942 can include one or more features described above with respect to the signal booster systems of FIGS. 1A-9B.

Although not shown in FIG. 10A, the outdoor signal booster 942 includes an integrated base station antenna, booster circuitry, and a cable loss compensation circuit for compensating for a loss of the cable 943. The cable loss compensation circuit can be implemented in accordance with any of the cable loss compensation schemes described herein.

In the illustrated embodiment, the outdoor signal booster 942 is mounted on a roof 955 of a building 952. The outdoor signal booster 942 can be attached to the roof 955 in a wide variety of ways, such as by using a wide variety of mounts and/or fasteners. Although FIG. 10A illustrates an example in which the outdoor signal booster 942 is attached to a top of the roof 955, the teachings are applicable to configuration in which an outdoor signal booster is attached to other surfaces of a building, including, but not limited to, an exterior surface of a wall. Furthermore, in other embodiments, a signal booster is installed indoors.

In certain implementations, the integrated base station antenna of the outdoor signal booster 942 is an omnidirectional antenna operable to transmit and receive signals a full 360 degrees around a perimeter of a building. In other implementations, the base station antenna is a directional antenna, such as a Yagi antenna, that is pointed in a direction of a particular base station.

In certain implementations, structures of a building are advantageously used to provide shielding or isolation between an outdoor base station antenna and an indoor mobile station antenna. For example, a building's roof and/or walls can serve as a reflector or isolator for providing antenna-to-antenna isolation. In certain implementations, the outdoor signal booster 942 and/or secondary unit 941 can further include an explicit isolator configured to provide additional antenna-to-antenna isolation.

The secondary unit 941 includes an integrated mobile station antenna. Although illustrated as being placed on a desk, the secondary unit 941 can be placed and/or attached to a wide variety of surfaces in the interior of the building 952. In other embodiments, a mobile station antenna can connect to the secondary unit 941 via a cable or the secondary unit 941 can be omitted in favor of a standalone mobile station antenna.

In certain implementations, the indoor mobile station antenna of the secondary unit 941 is an omnidirectional or directional antenna configured to primarily radiate within an interior of the building 952. Thus, the indoor mobile station antenna can communicate with mobile devices within the building 952, such as mobile devices 953a-953c.

As shown in FIG. 10A, the secondary unit 941 receives power from a building power source (for instance, an AC outlet 954) over the power cable 945. Additionally, the power and RF cable 943 is used both for communicating RF signals between the secondary unit 941 and the outdoor signal booster 942 and for supplying the outdoor signal booster 942 with power. In certain implementations, secondary unit 941 and/or a power adapter of the power cable 945 provides AC to DC conversion.

The signal booster system 950 can be implemented using any suitable combination of features disclosed herein.

Although the mobile network 960 illustrates an example with three mobile devices and one base station, the mobile network 960 can include base stations and/or mobile devices of other numbers and/or types. For instance, mobile devices can include mobile phones, tablets, laptops, wearable electronics (for instance, smart watches), and/or other types of user equipment (UE) suitable for use in a wireless communication network.

Although an example with a home is shown, a signal booster system can be installed in a variety of types of buildings, such as homes, offices, commercial premises, factories, garages, barns, and/or any other suitable building.

The outdoor signal booster 942 can retransmit signals to and receive signals from the base station 951 using the booster's integrated base station antenna. Additionally, the secondary unit 941 can retransmit signals to and receive signals from the mobile devices 953*a*-953*c* using the unit's integrated mobile station antenna, in this embodiment.

The outdoor signal booster 942 can be used to communicate in a variety of types of networks, including, but not limited to, networks operating using FDD, TDD, or a combination thereof.

As a network environment changes, the outdoor signal booster 942 can communicate with different base stations. Thus, it will be understood that base station 951 represents a particular base station or group of base stations that the signal booster system 950 is in communication with at a particular time.

Thus, although FIG. 10A illustrates the outdoor signal booster 942 as communicating with one base station 951, the outdoor signal booster 942 can communicate with multiple base stations. For example, the outdoor signal booster 942 can be used to communicate with base stations associated with different cells of a network and/or with base stations associated with different networks, such as networks associated with different wireless carriers and/or frequency bands.

In certain implementations, the mobile devices 953*a*-953*c* can communicate at least in part over multiple frequency bands, including one or more cellular bands such as, Band II, Band IV, Band V, Band XII, and/or Band XIII For instance, in one example, the first mobile device 953*a* can operate using Advanced Wireless Services (AWS) (Band IV), the second mobile device 953*b* can operate using Personal Communication Services (PCS) (Band II), and the third mobile device 953*c* can operate using Cellular services (Band V). Furthermore, in certain configurations, all or a subset of the mobile devices 953*a*-953*c* can communicate using Long Term Evolution (LTE), and may transmit and receive Band XII signals, Band XIII signals, and/or other signals associated with LTE. The teachings herein are also applicable to communications using carrier aggregation, including those associated with 4.5G, 5G technologies, and other emerging mobile communication technologies.

Although specific examples of frequency bands and communication technologies have been described above, the teachings herein are applicable to a wide range of frequency bands and communications standards. For example, signal boosters can be used to boost a wide variety of bands, including, but not limited to, 2G bands, 3G bands (including 3.5G bands), 4G bands (including 4.5G bands), 5G bands, Wi-Fi bands (for example, according to Institute of Electrical and Electronics Engineers 802.11 wireless communication standards), and/or digital television bands (for example, according to Digital Video Broadcasting, Advanced Television System Committee, Integrated Services Digital Broadcasting, Digital Terrestrial Multimedia Broadcasting, and Digital Multimedia Broadcasting standards).

Accordingly, the signal booster system 950 can be configured to boost signals associated with multiple frequency bands so as to improve network reception for each of the mobile devices 953*a*-953*c*. Configuring the signal booster system 950 to service multiple frequency bands can improve network signal strength. For example, the signal booster system 950 can improve network signal strength of devices using the same or different frequency bands, the same or different wireless carriers, and/or the same or different wireless technologies. Configuring the signal booster system 950 as a multi-band booster can avoid the cost of separate signal boosters for each specific frequency band and/or wireless carrier.

FIG. 10B is a schematic diagram of a mobile network 980 according to one embodiment. The mobile network 980 includes a signal booster system 970, a base station 951 (one shown, in this example), and mobile devices 953*a*-953*c* (three shown, in this example). The signal booster system 970 includes a secondary unit 941, a power and RF cable 943, a short base station antenna cable 944, a power cable 945, an outdoor base station antenna 946, and a signal booster 947. For clarity of the figures, internal circuitry and components of the secondary unit 941 and the signal booster 947 are not shown in FIG. 10B.

In the illustrated embodiment, the signal booster 947 is installed in an attic 959 of the building 952. Additionally, the signal booster 947 connects to the outdoor base station antenna 946 over the short base station antenna cable 944. In certain implementations, the short base station antenna cable 944 is less than about 5 feet and/or provides less than 1 dB of loss at the highest signal frequency of interest.

Implementing the signal booster 947 in relatively close proximity to the outdoor base station antenna 946 can provide a number of advantages relative to a configuration in which a signal booster is far from a base station antenna. For example, a long cable connected from an indoor signal booster to an outdoor base station antenna can be several meters long, resulting in significant cable loss that degrades transmit power and/or receiver sensitivity. In contrast, the illustrated embodiment includes the signal booster 947 and outdoor base station antenna 946 in relatively close proximity and thus connected with low loss.

The power and RF cable 943 provides power to the signal booster 947, thereby enhancing convenience in applications in which a power outlet is not readily available near the signal booster 947.

The signal booster system 970 can be implemented with any of the cable loss compensation schemes described herein. For example, the signal booster 947 can include a cable loss compensation circuit for compensation for signal loss arising from the cable 943.

FIG. 11A is a schematic diagram of one embodiment of booster circuitry 1800. The booster circuitry 1800 of FIG. 11A corresponds to one embodiment of booster circuitry suitable for use in the signal booster systems disclosed herein. However, the signal booster systems herein can include other implementations of booster circuitry. The booster circuitry 1800 can operate using a wide variety of frequency bands and communication standards including, but not limited to, any of the frequency bands and communications standards described herein.

In the illustrated embodiment, the booster circuitry 1800 includes a first splitting/combining structure 1801 and a second splitting/combining structure 1802, which can be implemented in a wide variety of ways, including, but not limited to, using one or more multiplexers, one or more diplexers, one or more switches, and/or other suitable components for splitting and combining RF signals for a variety of types of communications, including, for example, FDD and/or TDD communications. The booster circuit 1800 further includes a group of uplink amplification circuits 1811*a*, 1811*b*, . . . 1811*m* and a group of downlink amplification circuits 1812*a*, 1812*b*, . . . 1812*n*.

In this embodiment, m uplink amplification circuits and n uplink amplification circuits are included in the booster circuitry 1800. The values of m and n can vary with application and/or implementation, and can be the same or different value.

As shown in FIG. 11A, the first splitting/combining structure 1801 receives an uplink signal (UL) and outputs an amplified downlink signal ($DL_{AMP}$). Additionally, the second splitting/combining structure 1802 receives a downlink signal (DL) and outputs an amplified uplink signal ($UL_{AMP}$).

In certain implementations, the first splitting/combining structure 1801 splits the received uplink signal (UL) into multiple uplink channel signals associated with uplink channels of multiple frequency bands. For example, each uplink channel signal can have a frequency range corresponding to the frequency range of an uplink channel of a particular frequency band. Additionally, the uplink amplification circuits 1811a, 1811b, ... 1811m amplify the uplink channel signals to generate amplified uplink channel signals, which are combined by the second splitting/combining structure 1802 to generate the amplified uplink signal ($UL_{AMP}$). Additionally, the second splitting/combining structure 1802 splits the received downlink signal (DL) into multiple downlink channel signals associated with downlink channels of the frequency bands. For example, each downlink channel signal can have a frequency range corresponding to the frequency range of a downlink channel of a particular frequency band. Additionally, the downlink amplification circuits 1812a, 1812b, ... 1812n amplify the downlink channel signals to generate amplified downlink channel signals, which are combined by the first splitting/combining structure 1801 to generate the amplified downlink signal ($DL_{AMP}$).

FIG. 11B is a schematic diagram of another embodiment of booster circuitry 1820. The booster circuitry 1820 of FIG. 11B corresponds to one embodiment of booster circuitry suitable for use in the signal booster systems disclosed herein. However, the signal booster systems herein can include other implementations of booster circuitry.

In the illustrated embodiment, the booster circuitry 1820 includes a first splitting/combining structure 1821, which includes a first diplexer 1841, a first multiplexer 1851, and a second multiplexer 1852. Additionally, the booster circuitry 1820 includes a second splitting/combining structure 1822, includes a second diplexer 1842, a third multiplexer 1853, and a fourth multiplexer 1854.

The booster circuit 1820 further includes a first group of uplink amplification circuits 1811a, 1811b, ... 1811m, a first group of downlink amplification circuits 1812a, 1812b, ... 1812n, a second group of uplink amplification circuits 1831a, 1831b, ... 1831p, and a second group of downlink amplification circuits 1832a, 1832b, ... 1832q. The values of m, n, p, and q can vary with application and/or implementation, and can be the same or different value.

In certain implementations, the first group of uplink amplification circuits 1811a, 1811b, ... 1811m and the first group of downlink amplification circuits 1812a, 1812b, ... 1812n provide amplification to signals less than a threshold frequency, while the second group of uplink amplification circuits 1831a, 1831b, ... 1831p and the second group of downlink amplification circuits 1832a, 1832b, ... 1832q provide amplification to signals greater than the threshold frequency.

FIG. 12 is a schematic diagram of one embodiment of an amplification circuit 1900. The amplification circuit or path 1900 of FIG. 12 illustrates one embodiment of an amplification circuit suitable for use as an uplink amplification circuit or downlink amplification circuit of a signal booster's booster circuitry. However, booster circuitry can include uplink and downlink amplification circuits implemented in a wide variety of ways. Accordingly, other implementations are possible.

In the illustrated embodiment, the amplification circuit 1900 includes a low noise amplifier 1901, a controllable attenuator 1902, a band filter 1903, a power amplifier 1904, and a power detector 1905.

In certain implementations, the detected power by the power detector 1905 is provided to control circuitry 1908 (for instance, a microprocessor, a microcontroller, a digital controller, and/or other suitable control circuitry). The control circuitry 1908 can use the detected power for a wide variety of functions, including, but not limited to, power control (for instance, automatic gain control), oscillation detection, and/or shutdown. In certain implementations, the control circuitry also provides control over gain of components of one or more RF amplification paths. For example, the control circuitry can control the attenuation provided by controllable attenuation components (for instance, digital step attenuators and/or voltage variable attenuators) and/or the gain provided by controllable amplification circuits (for instance, variable gain amplifiers and/or programmable gain amplifiers).

In certain implementations, the control circuitry 1908 also serves to provide cable loss compensation in accordance with the teachings herein.

In certain implementations, the control circuitry 1908 is shared by multiple uplink amplification circuits and/or downlink amplification circuits. For example, the control circuitry 1908 can provide centralized control of the signal booster system.

Figure 13:
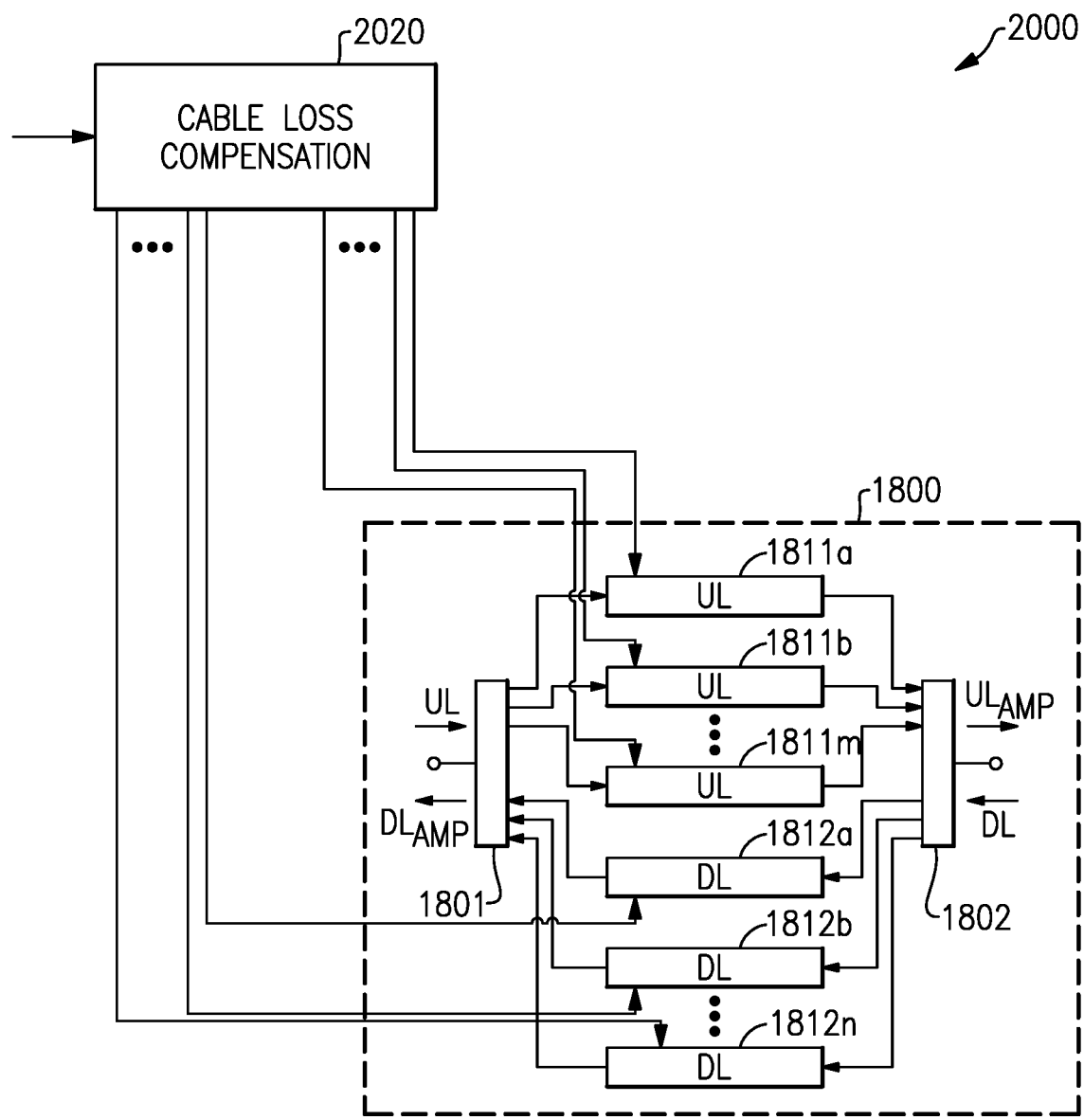
FIG. 13 is a signal booster including cable loss compensation according to another embodiment.

FIG. 13 is a signal booster 2000 including cable loss compensation according to another embodiment. The signal booster 2000 includes a cable loss compensation circuit 2020 and booster circuitry 1800.

In the illustrated embodiment, each uplink amplification circuit 1811a, 1811b ... 1811m and each downlink amplification circuit 1812a, 1812b, ... 1812n receives a separately controllable gain adjustment from the cable loss compensation circuit 2020.

Implementing the cable loss compensation circuit 2020 to generate multiple gain adjustment signals for uplink and/or multiple gain adjustment signals for downlink can provide a number of advantages. For example, implementing the cable loss compensation circuit 2020 in this manner can provide gain adjustment suitable for a particular signal frequency and/or band (for instance, a particular 3GPP frequency band), thereby tailoring performance in multi-band booster applications.

Any of the compensation schemes herein can employ a cable loss compensation circuit that provides separately controllable gain adjustment for particular frequency channels and/or bands.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not only the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A signal booster system comprising:
   a plurality of antennas comprising a first antenna and a second antenna;
   a first cable; and
   a signal booster connected to the first antenna via the first cable and configured to be powered by a DC supply voltage provided over the first cable, wherein the signal booster comprises:
      booster circuitry configured to generate a boosted RF signal based on amplifying an RF signal received on the second antenna, and to send the boosted RF signal to the first antenna via the first cable; and
      a cable loss compensation circuit configured to adjust a gain of the booster circuitry to compensate for a loss of the first cable based on a DC voltage drop of the DC supply voltage provided over the cable.

2. The signal booster system of claim 1, wherein the signal booster further comprises a first DC detector configured to generate a first detection signal based on detecting a DC voltage level at one end of the cable, wherein the cable loss compensation circuit detects the DC voltage drop based on the first detection signal.

3. The signal booster system of claim 2, further comprising a second DC detector configured to generate a second detection signal based on detecting a DC voltage level at an opposite end of the cable, wherein the cable loss compensation circuit determines the DC voltage drop based on a voltage difference indicated by the first detection signal and the second detection signal.

4. The signal booster system of claim 2, wherein the cable loss compensation circuit determines the DC voltage drop based on a difference between the first detection signal and an assumed voltage level at an opposite end of the cable.

5. The signal booster system of claim 4, wherein the assumed voltage level corresponds to a regulated voltage level of a regulator circuit.

6. The signal booster system of claim 1, wherein the cable loss compensation circuit is further configured to compensate for the loss of the first cable based on detecting a current flowing through the first cable.

7. The signal booster system of claim 1, wherein the cable loss compensation circuit comprises data relating a plurality of detected DC voltages to a plurality of compensation values for providing compensation for cable loss.

8. The signal booster system of claim 1, wherein the first cable is a shared DC power and RF cable including a common conductor for carrying DC power and RF signals.

9. The signal booster system of claim 8, wherein the cable loss compensation circuit comprises an isolation and separation circuit including a series capacitor connected between the first cable and the booster circuitry, and an inductor including a first end connected to the first cable and a second end configured to output the DC supply voltage.

10. The signal booster system of claim 9, wherein the isolation and separation circuit further includes a decoupling capacitor connected between the second end of the inductor and a ground voltage.

11. The signal booster system of claim 1, wherein the first cable is a complex cable bundling separate conductors for carrying DC power and RF signals.

12. The signal booster system of claim 1, further comprising a secondary unit connected to one end of the first cable, wherein the signal booster is connected to an opposite end of the first cable.

13. The signal booster system of claim 12, wherein the first antenna is integrated with the secondary unit.

14. The signal booster system of claim 12, wherein the secondary unit comprises a power cable and an isolation and combining circuit including a series capacitor connected between the first antenna and the first cable and an inductor including a first end connected to the first cable and a second end connected to the power cable.

15. The signal booster system of claim 1, further comprising a second cable connected between the booster circuitry and the second antenna.

16. The signal booster system of claim 1, wherein the first antenna is a base station antenna configured to wirelessly communicate with one or more base stations of a cellular network, and the second antenna is a mobile station antenna configured to wirelessly communicate with one or more mobile stations of the cellular network.

17. The signal booster system of claim 1, wherein the second antenna is a base station antenna configured to wirelessly communicate with one or more base stations of a cellular network, and the first antenna is a mobile station antenna configured to wirelessly communicate with one or more mobile stations of the cellular network.

18. The signal booster system of claim 1, wherein the booster circuitry comprises a plurality of amplification paths associated with different frequency bands, wherein the cable loss compensation circuit is configured to provide different amounts of gain adjustment to at least a portion of the plurality of amplification paths.

19. The signal booster system of claim 1, wherein the cable loss compensation circuit is further configured to increase the gain of the booster circuitry by an amount about equal to the loss of the first cable.

20. The signal booster system of claim 1, wherein the cable loss compensation circuit is configured to increase a gain of the booster circuitry such that a gain of the signal booster system from the first antenna to the second antenna is about equal to a regulatory limitation with respect to antenna-to-antenna gain.

* * * * *

UNITED STATES PATENT AND TRADEMARK OFFICE
CERTIFICATE OF CORRECTION

PATENT NO. : 10,972,148 B2  
APPLICATION NO. : 16/743450  
DATED : April 6, 2021  
INVENTOR(S) : Hongtao Zhan Page 1 of 1

It is certified that error appears in the above-identified patent and that said Letters Patent is hereby corrected as shown below:

In the Specification

In Column 1, Line 7 (Approx.), delete "Aug. 24, 2018" and insert --Sep. 24, 2018--.

In Column 23, Line 33, delete "XIII For" and insert --XIII. For--.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*